(12) United States Patent
Bewlay et al.

(10) Patent No.: US 7,839,089 B2
(45) Date of Patent: Nov. 23, 2010

(54) HERMETICAL LAMP SEALING TECHNIQUES AND LAMP HAVING UNIQUELY SEALED COMPONENTS

(75) Inventors: Bernard P. Bewlay, Schenectady, NY (US); James A. Brewer, Scotia, NY (US); Sylvain S. Coulombe, N-D Ile-Perrot (CA); Sylvia M. DeCarr, Schnecetady, NY (US); Luana E. Iorio, Clifton Park, NY (US); Anteneh Kebbede, Albany, NY (US); Timothy J. Sommerer, Ballston Spa, NY (US); James S. Vartuli, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 247 days.

(21) Appl. No.: 10/738,261

(22) Filed: Dec. 17, 2003

(65) Prior Publication Data

US 2004/0135510 A1    Jul. 15, 2004

Related U.S. Application Data

(63) Continuation-in-part of application No. 10/323,252, filed on Dec. 18, 2002, now Pat. No. 7,215,081.

(51) Int. Cl.
    *H01J 17/18* (2006.01)
(52) U.S. Cl. .................. 313/623; 313/634; 313/493
(58) Field of Classification Search ................. 313/573, 313/624, 625, 623, 635, 493, 634, 490
    See application file for complete search history.

(56) References Cited

U.S. PATENT DOCUMENTS

| 3,363,134 A | 1/1968 | Johnson |
| 3,385,463 A | 5/1968 | Lange |
| 3,519,406 A | 7/1970 | Hanneman et al. |
| 3,659,138 A | 4/1972 | Johnson et al. |
| 3,662,455 A | 5/1972 | Anderson |
| 3,693,007 A | 9/1972 | Kerekes |

(Continued)

FOREIGN PATENT DOCUMENTS

EP    0935278    8/1999

(Continued)

OTHER PUBLICATIONS

U.S. Appl. No. 10/323,252, filed Dec. 17, 2003, Bewlay et al.

(Continued)

*Primary Examiner*—Karabi Guharay
(74) *Attorney, Agent, or Firm*—Mary Louise Gioeni

(57) ABSTRACT

A system and method for hermetically sealing a lamp. Certain embodiments of the lamp have an arc envelope having an open end and, also, an end structure diffusion bonded to the arc envelope at the open end. The end structure also has a dosing passageway extending into the arc envelope. In other embodiments, a lighting device is provided with an end structure adapted to close an open end of an arc envelope, and a dosing tube diffusion bonded to the end structure. Another embodiment of the lighting device has an arc envelope and an end structure diffusion bonded to an open end of the arc envelope.

20 Claims, 14 Drawing Sheets

U.S. PATENT DOCUMENTS

| | | | |
|---|---|---|---|
| 3,872,341 A | 3/1975 | Werner et al. | |
| 3,882,344 A | 5/1975 | Knochel et al. | |
| 3,882,346 A | 5/1975 | McVey | |
| 3,885,181 A * | 5/1975 | Nelson et al. | 313/110 |
| 3,953,177 A | 4/1976 | Sedlatschek et al. | 428/450 |
| 3,974,410 A * | 8/1976 | Collins et al. | 313/42 |
| 4,011,480 A | 3/1977 | Jacobs et al. | |
| 4,065,691 A * | 12/1977 | McVey | 313/565 |
| 4,103,200 A | 7/1978 | Bhalla | |
| 4,155,758 A | 5/1979 | Evans et al. | |
| 4,291,250 A | 9/1981 | Bhalla | |
| 4,409,517 A | 10/1983 | Van Der Sande et al. | |
| 4,464,603 A | 8/1984 | McVey | |
| 4,507,584 A | 3/1985 | Coaton et al. | 313/624 |
| 4,545,799 A | 10/1985 | Rhodes et al. | |
| 4,585,972 A | 4/1986 | Hing | 313/636 |
| 4,707,636 A | 11/1987 | Morris | |
| 4,780,646 A | 10/1988 | Lange | 313/623 |
| 4,804,889 A | 2/1989 | Reid et al. | |
| 4,866,341 A * | 9/1989 | Ichiga et al. | 313/623 |
| 5,057,048 A | 10/1991 | Feuersanger et al. | |
| 5,321,335 A | 6/1994 | Klug et al. | 313/623 |
| 5,404,077 A | 4/1995 | Eichelbronner et al. | |
| 5,404,078 A | 4/1995 | Bunk et al. | |
| 5,424,609 A | 6/1995 | Geven et al. | 313/623 |
| 5,426,343 A | 6/1995 | Rhodes et al. | 313/623 |
| 5,437,744 A | 8/1995 | Carlen | |
| 5,484,315 A | 1/1996 | Juengst et al. | |
| 5,552,670 A | 9/1996 | Heider et al. | |
| 5,725,827 A | 3/1998 | Rhodes et al. | |
| 5,783,907 A * | 7/1998 | Suzuki et al. | 313/625 |
| 5,973,453 A | 10/1999 | Van Vliet et al. | |
| 5,994,839 A | 11/1999 | Yamamoto et al. | 313/570 |
| 6,020,685 A * | 2/2000 | Wei et al. | 313/625 |
| 6,069,456 A | 5/2000 | Fromm et al. | |
| 6,126,889 A | 10/2000 | Scott et al. | |
| 6,215,254 B1 | 4/2001 | Honda et al. | |
| 6,216,889 B1 | 4/2001 | Chang | |
| 6,265,827 B1 | 7/2001 | Takahashi et al. | |
| 6,294,871 B1 | 9/2001 | Scott et al. | |
| 6,300,716 B1 | 10/2001 | Honda | |
| 6,375,533 B1 | 4/2002 | Torikai et al. | |
| 6,404,129 B1 | 6/2002 | Hendricx et al. | |
| 6,528,945 B2 | 3/2003 | Kelly et al. | 313/623 |
| 6,583,563 B1 | 6/2003 | Venkataramani et al. | 313/634 |
| 6,596,100 B2 | 7/2003 | Niimi | |
| 6,635,993 B1 | 10/2003 | Niimi | |
| 6,642,654 B2 | 11/2003 | Niimi | |
| 6,657,388 B2 | 12/2003 | Wijenberg et al. | |
| 6,750,612 B2 | 6/2004 | Takagaki et al. | |
| 6,781,292 B2 | 8/2004 | Ishida et al. | |
| 6,781,312 B1 * | 8/2004 | Sulcs et al. | 313/634 |
| 6,791,267 B2 | 9/2004 | Niimi | |
| 6,812,642 B1 | 11/2004 | Niimi | |
| 6,815,894 B2 | 11/2004 | Takagaki et al. | |
| 6,873,109 B2 | 3/2005 | Ishigami et al. | |
| 7,525,252 B2 | 4/2009 | Iorio et al. | |
| 2002/0027421 A1 | 3/2002 | Kaneko et al. | |
| 2002/0117965 A1 | 8/2002 | Kotter et al. | |
| 2004/0108814 A1 | 6/2004 | Tsuda et al. | |
| 2004/0119413 A1 | 6/2004 | Kebbede et al. | |
| 2004/0119414 A1 | 6/2004 | Kebbede et al. | |
| 2004/0124776 A1 | 7/2004 | Iorio | |
| 2004/0135510 A1 | 7/2004 | Bewlay et al. | |
| 2004/0174121 A1 | 9/2004 | Tsuda et al. | |
| 2004/0183446 A1 | 9/2004 | Grundmann et al. | |
| 2005/0007020 A1 | 1/2005 | Tsuda et al. | |
| 2006/0001346 A1 | 1/2006 | Vartuli et al. | |
| 2006/0008677 A1 | 1/2006 | Bewlay et al. | |
| 2006/0012306 A1 | 1/2006 | Bewlay et al. | |

FOREIGN PATENT DOCUMENTS

| | | |
|---|---|---|
| EP | 1111654 | 6/2001 |
| EP | 1150337 | 10/2001 |
| EP | 1158567 | 11/2001 |
| EP | 1172839 | 1/2002 |
| EP | 1172840 | 1/2002 |
| EP | 1220295 | 7/2002 |
| EP | 1253616 | 10/2002 |
| EP | 1296355 | 3/2003 |
| EP | 1351276 | 10/2003 |
| EP | 1363313 | 11/2003 |
| EP | 1434247 | 6/2004 |
| JP | 64-086061 | 3/1989 |
| JP | 06-096734 | 4/1994 |
| JP | 07-228940 | 8/1995 |
| JP | 2004214194 | 7/2004 |
| WO | WO9825294 | 6/1998 |
| WO | WO 03/058674 | 7/2003 |
| WO | WO2003099741 | 12/2003 |
| WO | WO2004023517 | 3/2004 |
| WO | WO2004049390 | 6/2004 |
| WO | WO2004049391 | 6/2004 |
| WO | WO2004051699 | 6/2004 |
| WO | WO2004051700 | 6/2004 |
| WO | WO2004102614 | 11/2004 |

OTHER PUBLICATIONS

U.S. Appl. No. 10/952,940, filed Sep. 29, 2004, Bewlay et al.
U.S. Appl. No. 10/984,593, filed Nov. 9, 2004, Loureiro et al.
U.S. Appl. No. 11/172,649, filed Jun. 30, 2005, Bewlay et al.
U.S. Appl. No. 11/172,650, filed Jun. 30, 2005, Bewlay et al.
U.S. Appl. No. 11/172,651, filed Jun. 30, 2005, Bewlay et al.
U.S. Appl. No. 11/289,128, filed Nov. 29, 2005, Bewlay et al.
Tokumatsu Tachiwaki et al., "*Novel Synthesis of $Y_3Al_5O_{12}$ (YAG) Leading to Transparent Ceramics*", Solid State Communications, vol. 119, pp. 603-606, 2001.
Lei Wen et al., "*Synthesis of Nanocrystalline Yttria Powder and Fabrication of Transparent YAG Ceramics*", Journal of the European Ceramic Society, vol. 24, pp. 2681-2688, 2003.
D. Hreniak et al., "*Synthesis and Optical Properties of $Nd^3$+—Doped $Y_3Al_5O_{12}$ Nanoceramics*", Journal of Alloys and Compounds, vol. 341, pp. 183-186, 2002.
Guanshi Qin et al., "*Upconversion Luminescence of $Er^3$ In Highly Transparent YAG Ceramics*", Solid State Communications, vol. 132, pp. 103-106, 2004.
Jianren Lu et al., "*Neodymium Doped Yttrium Aluminum Garnet ($Y_3Al_5O_{12}$) Nanocrystalline Ceramics—A New Generation of Solid State Laser and Optical Materials*", Journal of Alloys and Compounds,. vol. 341, pp. 220-225, 2002.
A.K. Pradhan et al., "*Synthesis of Neodymium-Doped Yttrium Aluminum Garnet (YAG) Nanocrystalline Powders Leading to Transparent Ceramics*", Materials Research Bulletin, vol. 39, pp. 1291-1298, 2004.

\* cited by examiner

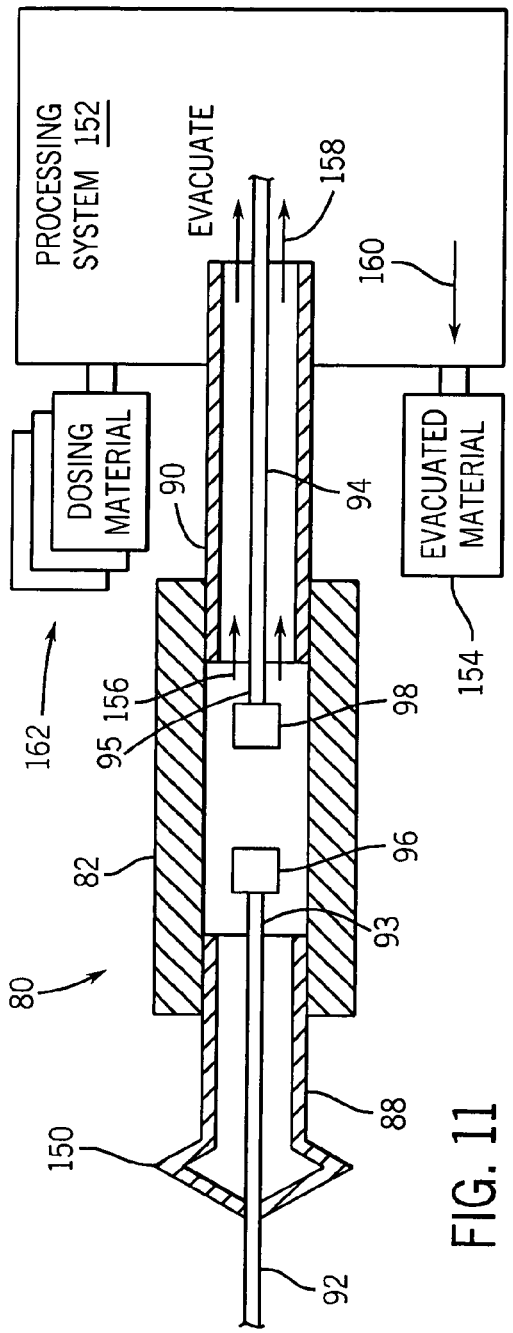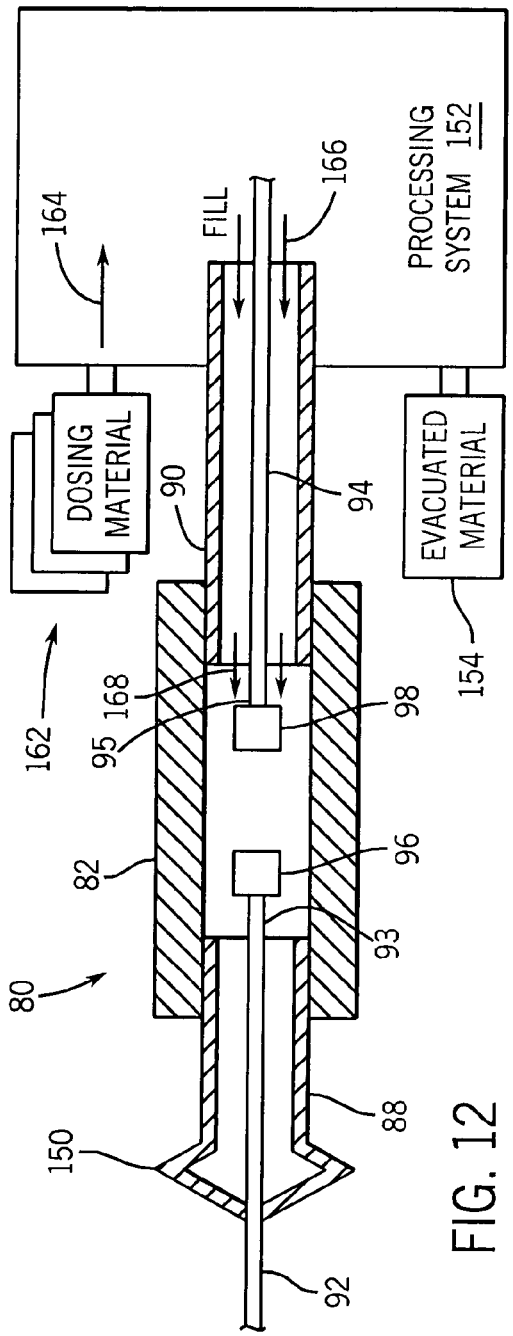

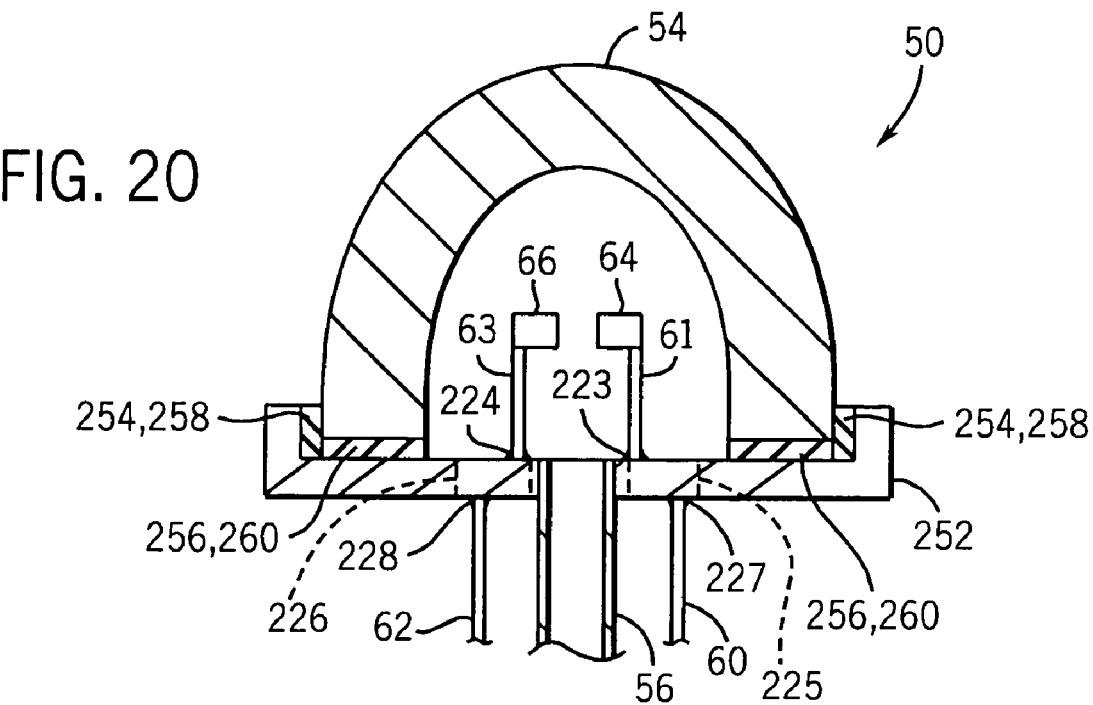
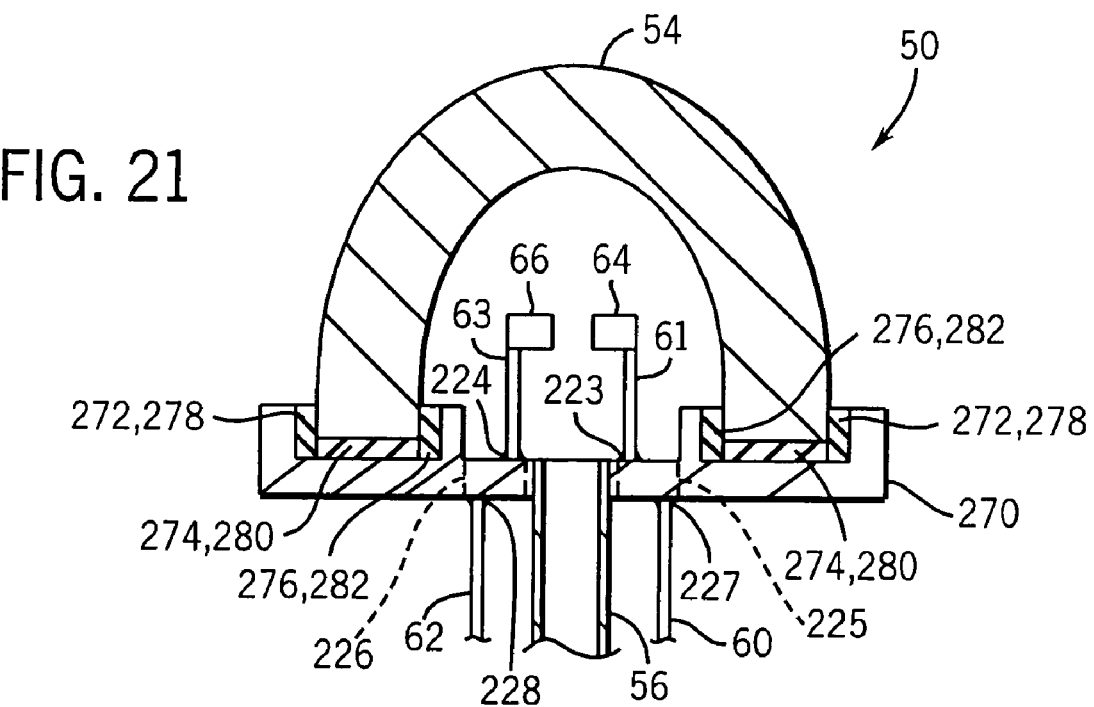

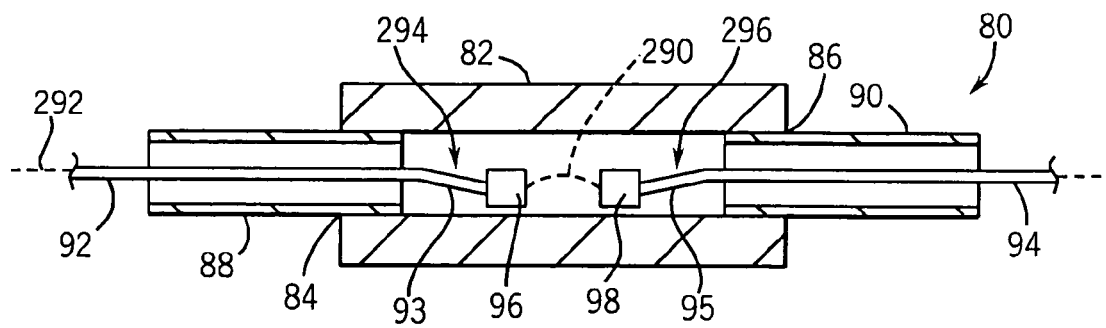
FIG. 22
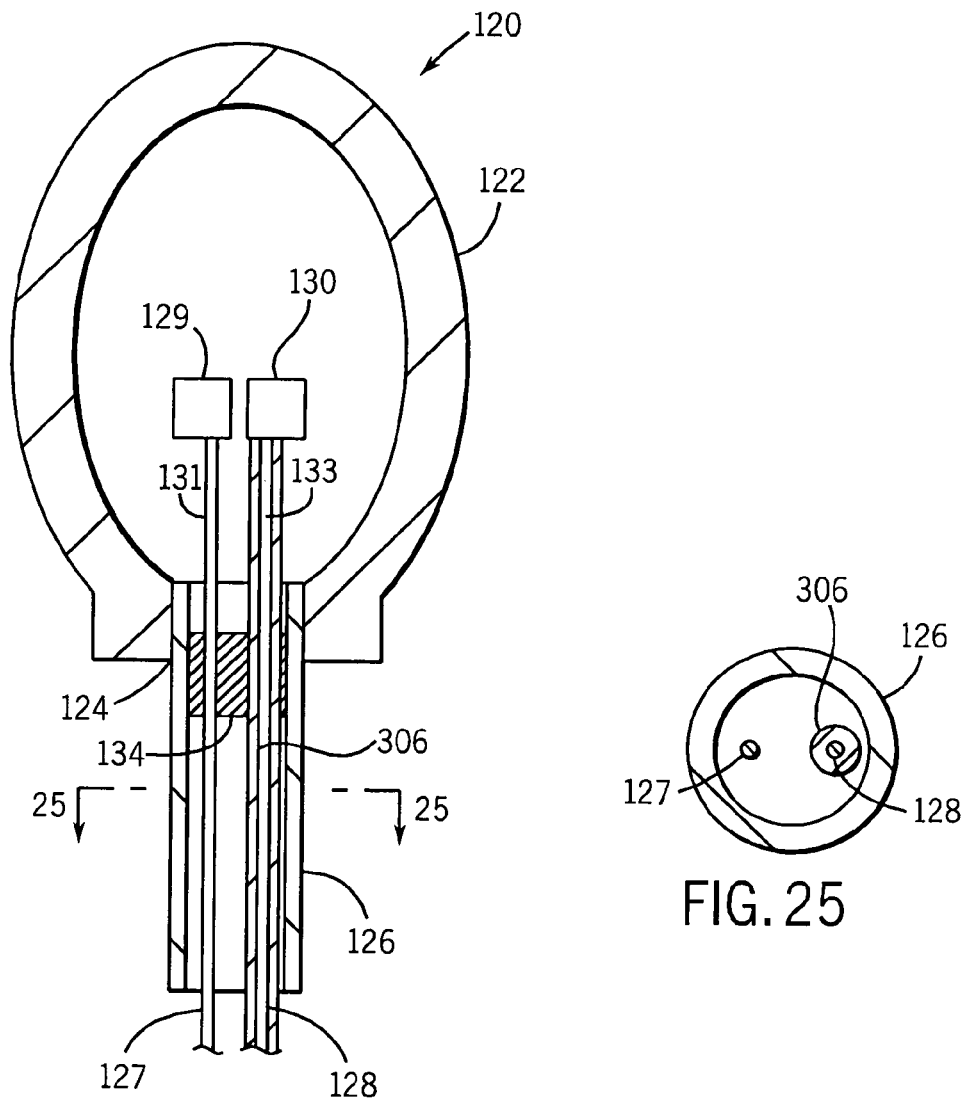
FIG. 24
FIG. 25

HERMETICAL LAMP SEALING TECHNIQUES AND LAMP HAVING UNIQUELY SEALED COMPONENTS

CROSS REFERENCE TO RELATED APPLICATIONS

This is a continuation-in-part of co-pending application Ser. No. 10/323,252 filed on Dec. 18, 2002 now U.S. Pat. No. 7,215,081.

BACKGROUND OF THE INVENTION

The present technique relates generally to the field of lighting systems and, more particularly, to high-intensity discharge (HID) lamps. Specifically, a hermetically sealed lamp is provided with improved sealing characteristics and resistance to corrosive dosing materials, such as halides and metal halides.

High-intensity discharge lamps are often formed from a ceramic tubular body or arc tube that is sealed to one or more end structures. The end structures are often sealed to this ceramic tubular body using a seal glass, which has physical and mechanical properties matching those of the ceramic components and the end structures. Sealing usually involves heating the assembly of the ceramic tubular body, the end structures, and the seal glass to induce melting of the seal glass and reaction with the ceramic bodies to form a strong chemical and physical bond. The ceramic tubular body and the end structures are often made of the same material, such as polycrystalline alumina (PCA). However, certain applications may require the use of different materials for the ceramic tubular body and the end structures. In either case, various stresses may arise from the sealing process, the interface between the joined components, and the materials used for the different components. For example, the component materials may have different mechanical and physical properties, such as different coefficients of thermal expansion (CTE), which can lead to residual stresses and sealing cracks. These potential stresses and sealing cracks are particularly problematic for high-pressure lamps.

The geometry of the interface between the ceramic tubular body and the end structures also may attribute to the foregoing stresses. For example, the end structures are often shaped as a plug or a pocket, which interfaces both the flat and cylindrical surfaces of the ceramic tubular body. If the components have different coefficients of thermal expansion and elastic properties, then residual stresses arise because of the different strains that prevent relaxation of the materials to stress free states. For example in the case of the plug type end structure, if the plug has a lower coefficient of thermal expansion than the ceramic tubular body and seal glass, then compressive stresses arise in the ceramic-seal glass region while tensile stresses arise in the plug region.

In addition to the ceramic tubular body and end structures, high-intensity discharge lamps also include a variety of internal materials (e.g., gases) and electrode materials to create the desired high-intensity discharge for lighting. The particular internal materials disposed in the high-intensity discharge lamps can affect the sealing characteristics, the light characteristics, and the type of materials that may be workable for the lamp components and the seal glass. For example, certain internal materials, such as halides and metal halides, may be desirable for lighting characteristics, but they are corrosive to some of the ceramic and metallic components that comprise the tubular body and end structure.

In certain applications, such as light projection requiring good optical control, existing high-intensity discharge lamps provide undesirable light and color characteristics. For example, existing high-intensity discharge lamps are often limited to their "projected screen lumens", i.e., both a large apparent source size and insufficient red content in the light spectrum contribute to the amount of projected screen lumens. The light scattering or source size is expressed quantitatively as the "etendue," while the lack of red content is expressed quantitatively by the "color efficiency" of the high-intensity discharge lamps. Both of these shortcomings limit the screen brightness of a projection system, such as a computer or video projection system.

Accordingly, a technique is needed to provide a lighting system, such as high-intensity discharge lamp, with improved sealing characteristics.

BRIEF DESCRIPTION OF THE INVENTION

A system and method for hermetically sealing a lamp. Certain embodiments of the lamp have an arc envelope having an open end and, also, an end structure diffusion bonded to the arc envelope at the open end. The end structure also has a dosing passageway extending into the arc envelope. In other embodiments, a lighting device is provided with an end structure adapted to close an open end of an arc envelope, and a dosing tube diffusion bonded to the end structure. Another embodiment of the lighting device has an arc envelope and an end structure diffusion bonded to an open end of the arc envelope.

BRIEF DESCRIPTION OF THE DRAWINGS

The foregoing and other advantages and features of the invention will become apparent upon reading the following detailed description and upon reference to the drawings in which:

FIGS. 10, 11, 12, and 13 are cross-sectional side views of the lamp illustrated in FIG. 6 further illustrating a material dosing and sealing process of the lamp;

FIGS. 20 and 21 are cross-sectional side views of further embodiments of the lamp illustrated in FIG. 3 illustrating alternative end structures and seal configurations;

FIG. 22 is a cross-sectional side view of an alternate embodiment of the lamp illustrated in FIG. 6 having angled electrodes;

FIG. 24 is a cross-sectional side view of an alternate embodiment of the lamp illustrated in FIG. 8 having a non-conductive jacket around one of two leads within a dosing tube;

FIG. 25 is a cross-sectional view of the dosing tube illustrated in FIG. 24 further illustrating the isolation of the two leads by the non-conductive jacket;

DETAILED DESCRIPTION OF SPECIFIC EMBODIMENTS

Figure 1:
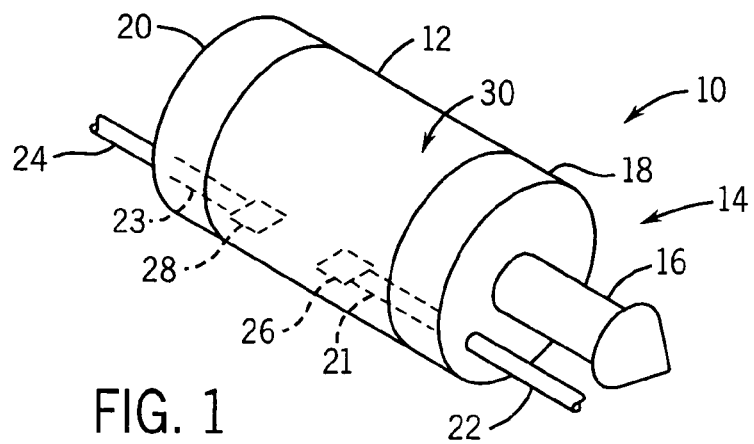
FIG. 1 is a perspective view of a lamp in accordance with certain embodiments of the present technique.

As described in detail below, embodiments of the present invention provide a variety of unique sealing systems and methods for reducing potential cracks and stresses within a lamp assembly, such as a high-intensity discharge lamp. These sealing systems and methods make the lamp operable at relatively higher temperatures and pressures exceeding typical operational conditions. For example, certain embodiments of the lamp are operable at internal pressures exceeding 200 bars and internal temperatures exceeding 1000 degrees Kelvin. In other embodiments, the lamp is operable at internal pressures exceeding 300 to 400 bars and internal temperatures exceeding 1300 to 1400 degrees Kelvin. The lamp is also workable at even higher temperatures and pressures, depending on the particular structural materials, internal dosing materials (e.g., inert gas, mercury, etc.), geometries, and other characteristics. In addition to the foregoing temperature and pressure conditions, the lamp is workable with a variety of corrosive internal dosing materials, such as halide and metal halide.

As discussed in further detail below, the foregoing characteristics of the lamp are attributed to the use of material diffusion sealing techniques, room temperature sealing techniques, localized or focused heat sealing techniques, simplified seal interfaces, multi-region seal techniques, and/or corrosion resistant materials. For example, the material diffusion sealing techniques facilitate the elimination of a seal material or interface substance at the bonding interface between lamp components. The elimination of this seal material interface reduces the potential for residual stresses and eventual cracks, which are often attributed to the different coefficients of thermal expansion (CTE) of the various lamp components and the seal material. Additionally, the elimination of a seal material facilitates a reduction in the risk for corrosion or detrimental interaction with the dose. The non-thermal or room temperature sealing techniques create a seal by mechanically deforming or crimping ductile materials at room temperature. The localized or focused heat sealing techniques substantially reduce thermal shock and damage to the lamp components by focusing the heat (e.g., laser welding) on the desired seal region. The simplified seal interfaces substantially reduce the potential for compressive and tensile stresses between components having different coefficients of thermal expansion. For example, certain components are sealed end-to-end, such that the interface is along a single plane. Accordingly, this planar interface or butt-seal substantially eliminates the potential for compressive or tensile stresses between the bonded components. The multi-region seal techniques also reduce the potential for compressive and tensile stresses between components having different coefficients of thermal expansion. Instead of having a planar interface, these multi-region seal techniques physically divide and/or apply different seal materials to the various portions of the seal interface. As discussed in detail below, embodiments of the lamp are formed from a variety of materials capable of sealing by the foregoing techniques, while also being able to withstand relatively high temperatures and pressures and corrosive materials, such as halides.

Although the present technique is applicable to a wide variety of lighting systems, the unique features introduced above are described with reference to several exemplary lamps illustrated in FIGS. 1-21. Turning now to these illustrations, FIG. 1 is a perspective view of a lamp 10 in accordance with certain embodiments of the present invention. As illustrated, the lamp 10 comprises a hermetically sealed assembly of a hollow body or arc envelope 12, a dosing structure 14 having a dosing tube 16 extending through an end structure 18, and an end structure 20. As illustrated, the arc envelope 12 has a cylindrical or tube-shaped geometry, while the end structure 20 has a disc-shaped or cap-type geometry. The lamp 10 also has lead wires 22 and 24 extending through (or from) the end structures 18 and 20 to the arc envelope 12. In the arc envelope, arc electrodes 21 and 23 extend from the lead wires 22 and 24 and terminate at arc tips 26 and 28. The arc gap between these arc tips 26 and 28 is set according to the distance of insertion of the arc electrodes 21 and 23 into the end structures 18 and 20. An internal dosing material 30 also may be disposed inside the hermetically sealed assembly. For example, certain embodiments of the dosing material 30 comprise a rare gas and mercury. Other embodiments of the dosing material 30 further comprise a halide, such as bromine, or a rare-earth metal halide.

As discussed in further detail below, certain embodiments of the lamp 10 are bonded or sealed together by one or more seal materials, a material diffusion or co-sintering process, localized heating, and/or other suitable techniques. For example, one embodiment of the lamp 10 has a seal material applied between the end structures 18 and 20 and opposite ends of the arc envelope 12. In another embodiment, the end structures 18 and 20 are bonded to opposite ends of the arc envelope 12 via material diffusion without using any seal material. Similarly, some embodiments of the lamp 10 have the dosing tube 16 and the lead wires 22 and 24 bonded to the respective end structures 18 and 20 by the application of one or more seal materials, material diffusion, and/or localized heating. After injecting the dosing material 30 into the arc envelope 12, the dosing tube 16 is sealed by localized heating, cold welding, crimping, and/or other suitable sealing techniques.

Various embodiments of the lamp 10 also have a variety of different lamp configurations and types, such as a high intensity discharge (HID) or an ultra high intensity discharge (UHID) lamp. For example, certain embodiments of the lamp 10 comprise a high-pressure sodium (HPS) lamp, a ceramic metal halide (CMH) lamp, a short arc lamp, an ultra high pressure (UHP) lamp, or a projector lamp. As mentioned above, the lamp 10 is uniquely sealed to accommodate relatively extreme operating conditions. Externally, some embodiments of the lamp 10 are capable of operating in a vacuum, nitrogen, air, or various other gases and environments. Internally, some embodiments of the lamp 10 retain pressures exceeding 200, 300, or 400 bars and temperatures exceeding 1000, 1300, or 1400 degrees Kelvin. For example, certain configurations of the lamp 10 operate at internal pressure of 400 bars and an internal temperature at or above the dew point of mercury at 400 bars, i.e., approximately 1400 degrees Kelvin. These higher internal pressures are also particularly advantageous to short arc lamps, which are capable of producing a smaller (e.g., it gets smaller in all directions) arc as the internal lamp pressure increases. Different embodiments of the lamp 10 also hermetically retain a variety of dosing materials 30, such as a rare gas and mercury. In some embodiments, the dosing material 30 comprises a halide (e.g., bromine, iodine, etc.) or a rare earth metal halide.

The components of the lamp 10 are formed from a variety of materials, which are either identical or different from one another. For example, different embodiments of the arc envelope 12 are formed from a variety of transparent ceramics and other materials, such as yttrium-aluminum-garnet, ytterbium-aluminum-garnet, microgram polycrystalline alumina (μPCA), alumina or single crystal sapphire, yttria, spinel, and ytterbia. Other embodiments of the arc envelope 12 are formed from conventional lamp materials, such as polycrystalline alumina (PCA). However, the foregoing materials advantageously provide lower light scattering and other desired characteristics. Various embodiments of the arc envelope 12 also have different forms, such as a bulb, a cylinder, a semi-sphere, or any other suitable hollow body.

Turning to the end structures 18 and 20 of the lamp 10, these components are formed from a variety of ceramics and other suitable materials, such as niobium, niobium coated with a corrosion resistant material (e.g., a halide resistant material), a cermet (e.g., a zirconia-stabilized cermet, an alumina-tungsten, etc.), and other conductive or non-conductive materials. For example, certain embodiments of the zirconia-stabilized cermet include a molybdenum-zirconia-stabilized cermet or a tungsten-zirconia-stabilized cermet. Moreover, in different embodiments of the zirconia-stabilized cermet, the zirconia is stabilized by yttria, calcia, magnesia, or a suitable lanthanide. Niobium has a coefficient of thermal expansion that is close to that of useful ceramics, plus it is thermochemically stable against hot sodium and mercury vapor. Accordingly, niobium is particularly advantageous for some applications. However, if a corrosive material such as halide is disposed within the lamp 10, then a corrosion resistant material is desirable. For example, a corrosion resistant material comprising molybdenum is particularly resistant to hot halide vapor. In one embodiment, the end structures 18 and 20 comprise a niobium plate coated with a thin layer of molybdenum. The thin layer is sufficiently thin to minimize the mismatch in the coefficients of thermal expansion between molybdenum and the ceramic, thereby reducing the likelihood of eventual ceramic stress and cracking. A cermet, such as an alumina-molybdenum, an alumina-tungsten, a tungsten-yttria-stabilized zirconia, or a molybdenum-yttria-stabilized zirconia, is also particularly advantageous for the lamp 10. For example, certain cermets have a relatively close CTE match with the ceramic arc envelope 12, while also being resistant to hot halide vapors. An exemplary molybdenum-yttria-stabilized zirconia cermet has a composition of 35 to 70 percent by volume of zirconia. In certain embodiments, the molybdenum-yttria stabilized zirconia cermet has about 55 to 65 percent volume of zirconia. However, any other suitable molybdenum-yttria stabilized zirconia composition is within the scope of the present technique.

Regarding the electrical components of the lamp 10, certain embodiment of the lead wires 22 and 24 penetrate the end structures 18 and 20 and are in physical contact with electrodes 21 and 23 if the end structure materials are not conducting. In other embodiments, the lead wires 22 and 24 mount directly to the end structures 18 and 20 if the end structure material is electrically conductive, thereby forming a conductive pathway from 24 to 23 via 20 and from 22 to 21 via 18. The lead wires 22 and 24 comprise any suitable materials, such as tungsten or molybdenum. Further embodiments of the lamp 10 have these lead wires 22 and 24 diffusion bonded to the end structures and dosing tubes if the materials are compatible. For example, exemplary diffusion bonds comprise a tungsten-cermet diffusion bond or molybdenum diffusion bond between the respective components. Similarly, the electrodes 21 and 23 and the electrode tips 26 and 28 comprise tungsten or any other suitable material.

Turning to the dosing tube 16, different embodiments of the lamp 10 have a variety of different configurations and material compositions, such as niobium. However, certain embodiments of the dosing tube 16 provide stability at high temperatures and pressures, stability against corrosive materials such as hot halide vapors, and ductility for cold welding the dosing tube 16. For example, some embodiments of the dosing tube 16 are formed from an alloy of molybdenum and rhenium, both of which are stable against hot halides. Although any suitable composition is within the scope of the present technique, an exemplary molybdenum-rhenium alloy comprises about 35 to 55 percent weight of rhenium. In certain embodiments, the molybdenum-rhenium alloy comprises about 44 to 48 percent weight of rhenium. However, any other suitable molybdenum-rhenium composition is within the scope of the present technique. Alloys of molybdenum and rhenium are also sufficiently ductile to allow the dosing tube 16 to be hermetically sealed via a crimping process, a cold welding process, or any other suitable mechanical deformation technique. Combinations and/or multiple steps of the foregoing crimping, cold welding, and localized heating are also used to seal the dosing tube 16 in certain embodiments of the lamp 10. However, in an exemplary embodiment of the lamp 10, the initial hermetic seal of the dosing tube 16 is made without external heat (i.e., via cold welding). In this manner, the volatile components of the dosing materials 30 are not unduly heated within the arc envelope 12. Moreover, the cold welding substantially eliminates thermal shock to the arc envelope 12 and the other components of the lamp 10. If desired, localized heating is applied to the cold weld to facilitate a stronger seal of the dosing tube 16. For example, if a crimping tool is used to provide the cold weld, then one technique of applying localized heat is to heat the crimp jaws of the tool. Another localized heating technique involves applying localized heat to the cold weld after its initial creation by the tool. In this manner, the localized heat ensures that the cold welded or crimped dosing tube 16 withstands higher pressures, such as internal pressures exceeding 1 to 500 atmospheres (e.g., 200, 300 or 400 atm.) Laser welding is one exemplary localized heating technique.

As discussed above, the dosing tube 16 of the dosing structure 14 enables the volume of the arc envelope 12 to be evacuated and back filled with the desired dosing material 30, such as a rare gas, mercury, halides, and metal halides. As discussed in further detail below, an exemplary embodiment of the evacuation and back fill process is performed by simply attaching the dosing tube 16 to a suitable processing station, as opposed to handling the assembly in a dry box and/or furnace. This is particularly advantageous when the room temperature rare gas pressure in the arc envelope 12 is substantially above one bar.

Turning to the assembly process, certain embodiments of the lamp 10 are assembled with seal materials, such as glass or braze. During the assembly process, the seal materials are disposed between the components and heated to join the components together. For example, according to certain embodiments of the lamp 10, the assembly process involves heating a seal glass material between the arc envelope 12 and the end structures 18 and 20, between the end structures 18 and 20 and the dosing tube 16, and/or between the end structures 18 and 20 and the lead wires 22 and 24. The heating is applied by a variety of non-localized and localized heating techniques, ranging from a furnace to a laser. Certain embodiments of the sealing materials comprise a sealing glass, such as calcium aluminate, dysprosia-alumina-silica, magnesia-alumina-silica, and yttria-calcia-alumina. Other potential non-glass materials comprise niobium-based brazes or any other suitable material. Some of these sealing glasses are capable of high temperature operation. For example, the calcium aluminate seal materials are capable of operation at temperatures up to approximately 1500 degrees Kelvin.

A seal-material-free bond is also provided between components in some embodiments of the lamp 10. Accordingly, the assembly process bonds the components together without any intermediate sealing glass or braze material between the individual components, i.e., a seal-material-free bond. One embodiment of the seal-material-free bond is achieved by material diffusion or co-sintering between the adjacent components. According to some embodiments of the lamp 10, adjacent components comprising molybdenum are bonded together by molybdenum diffusion. For example, in one exemplary embodiment, molybdenum lead wires 22 and 24, end structures 18 and 20 formed by an alumina-molybdenum or molybdenum-zirconia-stabilized cermet (e.g., zirconia stabilized by yttria, calcia, magnesia, or a suitable lanthanide), and a molybdenum-rhenium dosing tube 16 are thermally bonded together via molybdenum diffusion of the molybdenum in each adjacent component. Another example is the material diffusion of aluminum and zirconia between a sapphire or yttrium-aluminum-garnet (YAG) arc envelope 12 and cermet end structures 18 and 20. Different embodiments of the cermet end structures 18 and 20 comprise a molybdenum-alumina cermet or a molybdenum-zirconia-stabilized cermet (e.g., zirconia stabilized by yttria, calcia, magnesia, or a suitable lanthanide). A further example is a material diffusion bond formed between YAG and alumina-molybdenum or a suitable metal-cermet interface. Other materials also may be used to facilitate the foregoing material diffusion or co-sintering across the adjacent components of the lamp 10. In addition, certain embodiments of the lamp assembly process employ focused or localized heating techniques (e.g., a laser) to facilitate the foregoing seal-material-free bond between the various components of the lamp 10. As mentioned above, the exclusion of seal material substantially eliminates the potential for seal cracks and stresses, which are correlated to different coefficients of thermal expansion between the seal material and lamp components. Given the susceptibility of some seal materials to corrosive dosing materials 30, such as halides and metal halides, the foregoing seal-material-free bonding techniques further improve the lamp 10 for operation with such corrosive materials.

To reduce potential stresses and seal cracks, the lamp assembly process also uses modified structural interfaces between the components in various embodiments of the lamp 10. For example, as discussed in further detail below, the modified structural interfaces generally have fewer angles or step-shaped geometries between the components, thereby reducing the potential for tensile and/or compressive stresses to develop between the components. This is particularly advantageous for components having different coefficients of thermal expansion. For example, the arc envelope 12 and the end structures 18 and 20 illustrated in FIG. 1 are sealed end-to-end, i.e., butt-sealed, to reduce the likelihood of the foregoing stresses and seal cracks. In this manner, the end-to-end seal is in a single plane that is not subject to one of the components compressing or expanding relative to the other.

Figure 2:
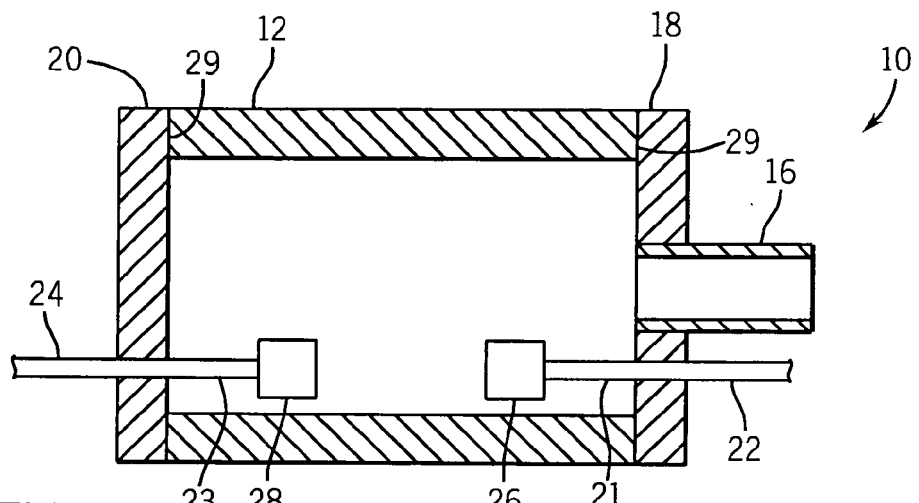
FIG. 2 is a cross-sectional side view of the lamp illustrated in FIG. 1 illustrating a hermetically sealed assembly of an arc envelope, end structures, and a dosing tube.

In view of the unique features and materials introduced above, various embodiments of the lamp 10 are discussed with reference to FIGS. 2-33. FIG. 2 is a cross-sectional side view of the lamp 10 illustrating an exemplary end-to-end or butt-seal 29 between the end structures 18 and 20 and the opposite ends of the arc envelope 12. As illustrated, the end structures 18 and 20 do not extend into or around the circumference of the arc envelope 12. By reducing the seal interface to a single plane, i.e., the abutted end surfaces, the butt-seal 29 effectively reduces the stresses and cracks generally associated with multi-angled or multi-stepped seal interfaces. This butt-sealing technique can be used with any lamp configuration or type, such as lamps having one or more open ends that can be sealed with an end structure.

Figure 3:
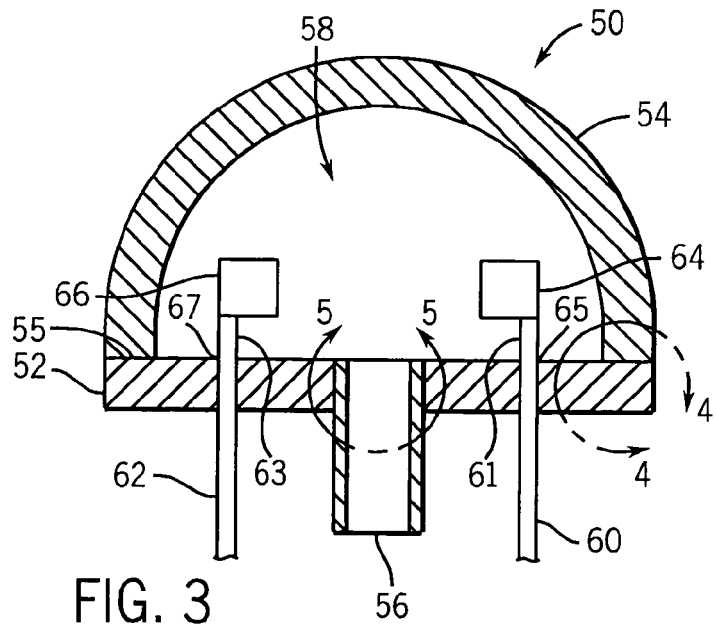
FIG. 3 is a cross-sectional side view of an alternate embodiment of the lamp having a curved arc envelope, an end structure, and a dosing tube in accordance with certain embodiments of the present technique.

FIG. 3 is a cross-sectional side view of an alternative lamp 50, which comprises a single end structure 52 butt-sealed to a hollow body or arc envelope 54 at a planar or ring-shaped seal interface 55. As illustrated, the arc envelope 54 has a dome-shaped or cup-shaped geometry. As described above, the present technique utilizes any suitable joining or sealing mechanisms, such as a sealing material, co-sintering, localized heating, and/or induction heating. Similar to the lamp 10 illustrated in FIG. 1, the lamp 50 also includes a dosing tube 56 extending through the end structure 52 into the arc envelope 54, such that a dosing material 58 can be injected into the lamp 50. The illustrated lamp 50 also includes lead wires 60 and 62 extending to arc electrodes 61 and 63, which have arc tips 64 and 66 within the arc envelope 54. In this illustrated embodiment, the end structure 52 comprises accurately positioned openings 65 and 67 for the arc electrodes 61 and 63 and lead wires 60 and 62. These openings 65 and 67 directly control the arc spacing between the arc tips 64 and 66. Accordingly, the desired arc spacing is accurately set according to the position of the openings 65 and 67, which contrasts to the arc distance control described above with reference to FIGS. 2 and 3 (i.e., insertion distance of the arc electrodes). Again, as described above, the lamps 10 and 50 described with reference to FIGS. 1, 2, and 3 are formed from any of the materials and sealing processes noted above and described in further detail below.

Figure 4:
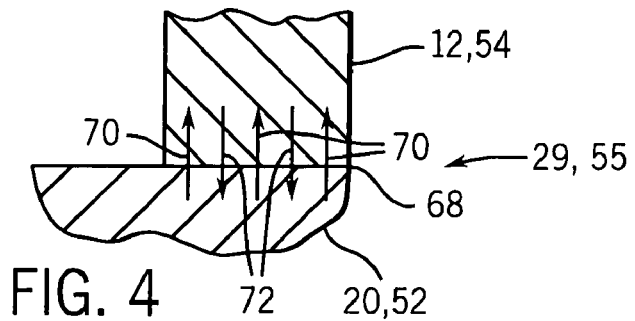
FIG. 4 is a close-up cross-sectional view illustrating an exemplary material-diffusion butt-joint of the arc envelopes and end structures illustrated in FIGS. 2 and 3.

FIG. 4 is a cross-sectional side view of one of the butt-seals 29 and 55 illustrated in FIGS. 2 and 3. As illustrated, a material-diffusion butt-seal 68 between the end structure 20, 52 and the arc envelope 12, 54 is achieved via co-sintering or diffusion bonding of the adjacent materials, as indicated by arrows 70 and 72. For example, embodiments of the end structures 20, 52 formed of molybdenum-zirconia cermet (e.g., zirconia stabilized by yttria, calcia, magnesia, or a suitable lanthanide) are thermally bonded with embodiments of the arc envelopes 12, 54 formed of alumina (e.g., a single crystal sapphire) by material diffusion of the alumina and zirconia between the two components to create the butt-seal 68. Alternatively, embodiments of the end structures 20, 52 formed of an alumina-molybdenum cermet are thermally bonded with embodiments of the arc envelopes 12, 54 formed of alumina (e.g., a single crystal sapphire) by material diffusion of the alumina between the two components to create the butt-seal 68. This co-sintering or diffusion bonding is applicable to any structural configuration of the end structures and arc envelopes and, also, for bonding various other components of the lamp 10.

Figure 5:
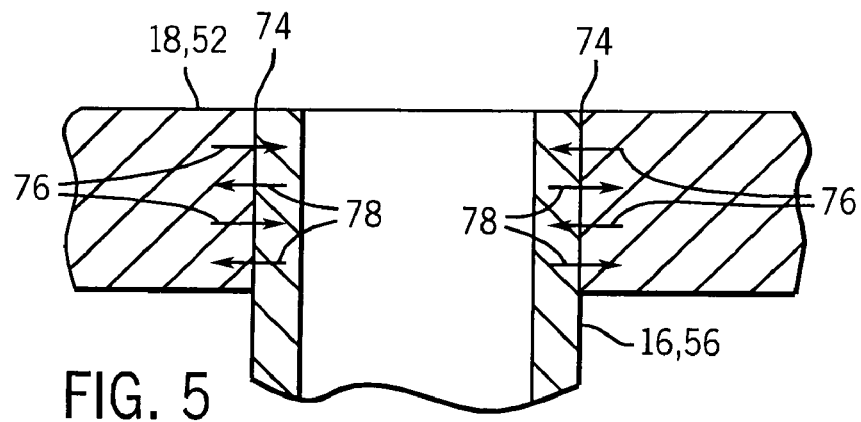
FIG. 5 is a close-up cross-sectional view illustrating an exemplary material-diffusion joint coupling the end structures and dosing tubes illustrated in FIGS. 2 and 3.

For example, FIG. 5 illustrates diffusion bonding of the dosing tube 16, 56 with the end structure 18, 52, as illustrated in FIGS. 2 and 3. As illustrated, a material-diffusion bond or seal 74 between the end structure 18, 52 and the dosing tube 16, 56 is achieved by co-sintering or diffusion bonding of the adjacent materials, as indicated by arrows 76 and 78. For example, embodiments of the end structures 18, 52 formed of an alumina-molybdenum or molybdenum-zirconia cermet (e.g., zirconia stabilized by yttria, calcia, magnesia, or a suitable lanthanide) are thermally bonded with embodiments of the dosing tubes 16, 56 formed of molybdenum-rhenium alloy by diffusion of the molybdenum between the two components to create the material-diffusion bond or seal 74. This co-sintering or diffusion bonding is applicable to any structural configuration of the dosing tube, including a configuration in which the dosing tube is coupled directly to the arc envelope rather than through an end structure.

Figure 6:
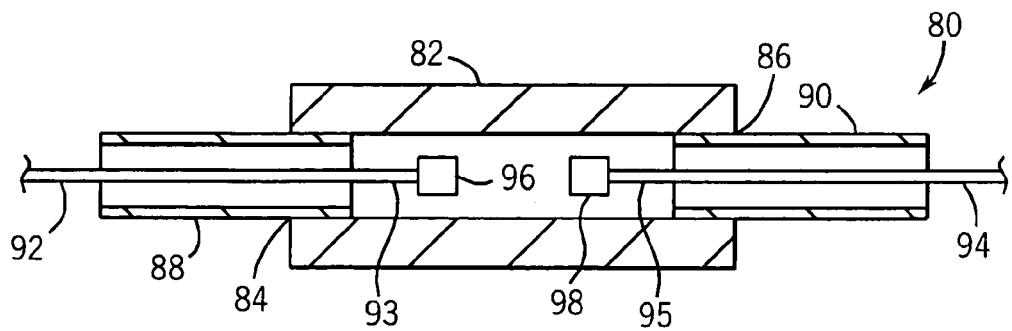
FIGS. 6, 7, and 8 are cross-sectional side views of further alternate embodiments of the lamp having one or more dosing tubes coupled to various arc envelopes.
Figure 7:
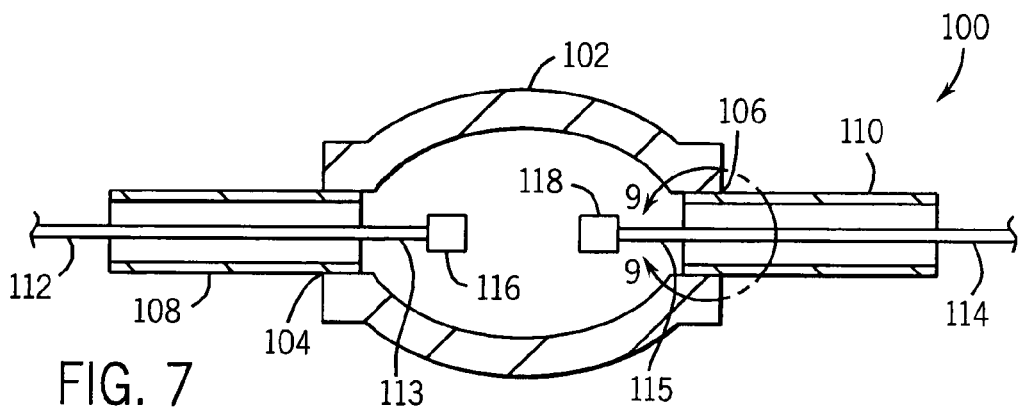
Figure 8:
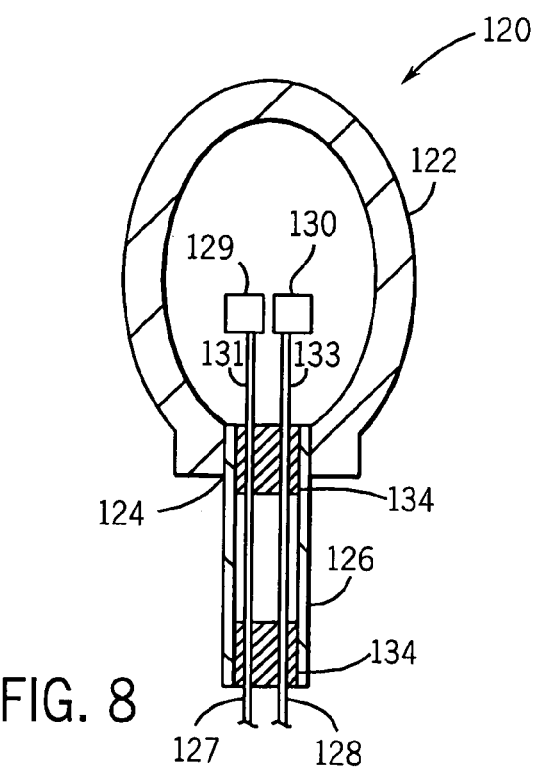

FIGS. 6-8 are cross-sectional side views of further alternate embodiments of the lamp 10 having one or more dosing tubes coupled to various arc envelopes. In these alternative embodiments, the illustrated arc envelopes have one or more receptacles in which the dosing tubes are inserted and sealed by a seal material, material-diffusion, localized heating, and/or other desired bonding techniques. For example, FIG. 6 is a cross-sectional side view illustrating an alternative lamp 80 having a cylindrical hollow body or arc envelope 82, which has opposite receptacles or open ends 84 and 86. As illustrated, the arc envelope 82 has a cylindrical or tube-shaped geometry. During assembly, dosing tubes 88 and 90 are fitted into these open ends 84 and 86 and subsequently bonded to form a hermetic seal with the arc envelope 82. Additionally, lead wires 92 and 94 extend through the dosing tubes 88 and 90 to the arc envelope 82. In turn, the lead wires 92 and 94 extend to arc electrodes 93 and 95 having arc tips 96 and 98, which are disposed within the arc envelope 82. As discussed below, the dosing tubes 88 and 90 are subsequently sealed or bonded shut by a crimping process, a localized heating process, and/or other suitable sealing techniques. If improved mechanical and/or thermal contact is desired between these components, then a filler or intermediate material is disposed about the lead wires 92 and 94 in the dosing tubes 88 and 90. For example, one embodiment of an intermediate material is a wire or other material that is wound about the lead wires 92 and 94. However, any suitable configuration is within the scope of the present technique. Embodiments of the assembly process of the lamp 80 are described in further detail below with reference to FIGS. 9-14.

As illustrated in FIG. 7, an alternative lamp 100 is provided with a generally round (e.g., oval, spherical, oblong, etc.) hollow body or arc envelope 102, which has opposite receptacles or open ends 104 and 106. As illustrated, the arc envelope 102 has an egg-shaped, oval, or generally elliptical geometry. Again, dosing tubes 108 and 110 are fitted into these open ends 104 and 106 and subsequently bonded to form a hermetic seal with the arc envelope 102. Additionally, lead wires 112 and 114 extend through the dosing tubes 108 and 110 to the arc envelope 102. In turn, the lead wires 112 and 114 extend to arc electrodes 113 and 115 having arc tips 116 and 118, which are disposed within the arc envelope 102. Again, the dosing tubes 108 and 110 are subsequently sealed or bonded shut by a crimping process, a localized heating process, and/or other suitable sealing techniques. Certain embodiments of the assembly process of the lamp 100 are described with reference to FIGS. 9-14.

FIG. 8 illustrates another alternative lamp 120 having a generally round (e.g., oval, spherical, oblong, etc.) hollow body or arc envelope 122, which has a single receptacle or open end 124. Again, the illustrated arc envelope 122 has an egg-shaped, oval, or generally elliptical geometry. In the illustrated embodiment, a single dosing tube 126 is fitted into the open end 124 and subsequently bonded to form a hermetic seal with the arc envelope 122. The elimination of an end structure in the illustrated embodiment improves optical performance and lighting efficiencies, because the lamp 120 has less light obstruction and a larger transparent surface to distribute the light. In addition, the elimination of the end structure improves sealing characteristics of the lamp 120 by reducing the number of bonds in the overall assembly of the lamp 120. Regarding the electronics of the lamp 120, lead wires 127 and 128 extend through the dosing tube 126 to the arc envelope 122. Inside the arc envelope 122, arc tips 129 and 130 are disposed on arc electrodes 131 and 133 that extend from the lead wires 127 and 128. Again, the dosing tube is subsequently sealed or bonded shut by a crimping process, a localized heating process, and/or other suitable sealing techniques. In the illustrated embodiment, the lead wires 127 and 128 are insulated from one another by spacers 134. These spacers 134 provide precise control of the arc gap between the arc tips 129 and 130. Other embodiments of the lamp 120 electrically isolate and space the lead wires 127 and 128 with an insulating filler material, an insulating wire jacket, and/or other desired isolating techniques. Various alternative embodiments are described below with reference to FIGS. 24, 25, and 26. Moreover, certain embodiments of the assembly process of the lamp 100 are described with reference to FIGS. 9-14.

Figure 9:
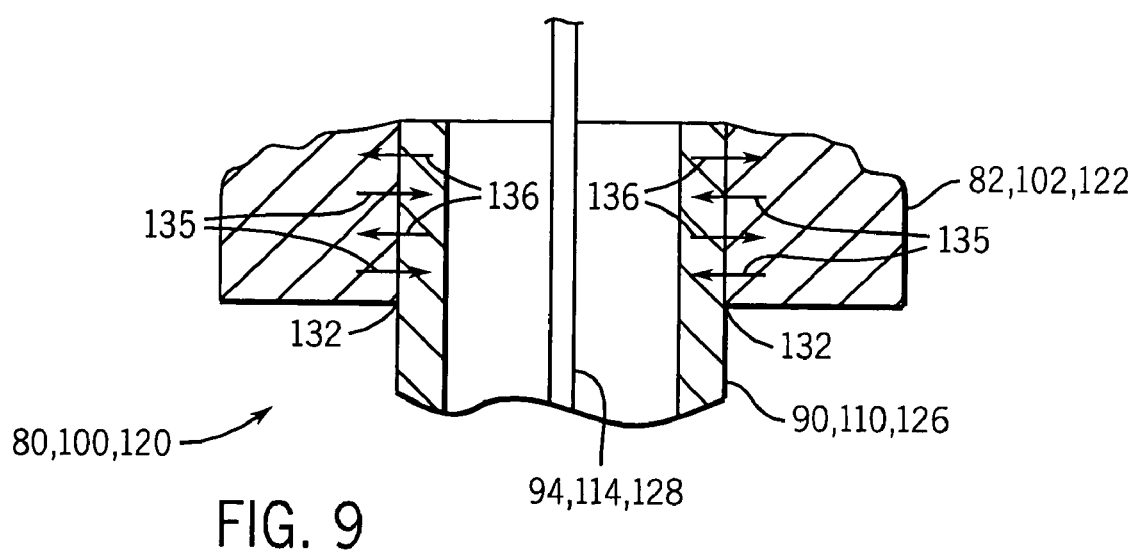
FIG. 9 is a close-up cross-sectional view illustrating an exemplary material diffusion joint coupling the various arc envelopes and dosing tubes illustrated in FIGS. 6-8.

As mentioned above, the dosing tubes 80, 100, and 120 are coupled to the respective arc envelopes 82, 102, and 122 by a variety of sealing mechanisms, such as one or more seal materials, localized heating techniques, and diffusion bonding or co-sintering techniques. For example, in certain embodiments, a seal glass frit or niobium-based braze is disposed at the interface between these dosing tubes 80, 100, and 120 and the respective arc envelopes 82, 102, and 122. A hermetic seal is then formed by either heating the entire lamp or by locally heating the interface region. In other embodiments, a seal-material-free bond is formed between the dosing tubes 80, 100, and 120 and the respective arc envelopes 82, 102, and 122. FIG. 9 is a close-up cross-sectional view illustrating an exemplary material-diffusion seal 132 coupling the dosing tubes 80, 100, and 120 with the respective arc envelopes 82, 102, and 122 illustrated in FIGS. 6-8. As illustrated, arrows 135 and 136 indicate the material diffusion between the respective dosing tubes 80, 100, and 120 and the arc envelopes 82, 102, and 122. Again, the particular type of material diffusion depends on the material compositions of each respective component.

Figure 10:
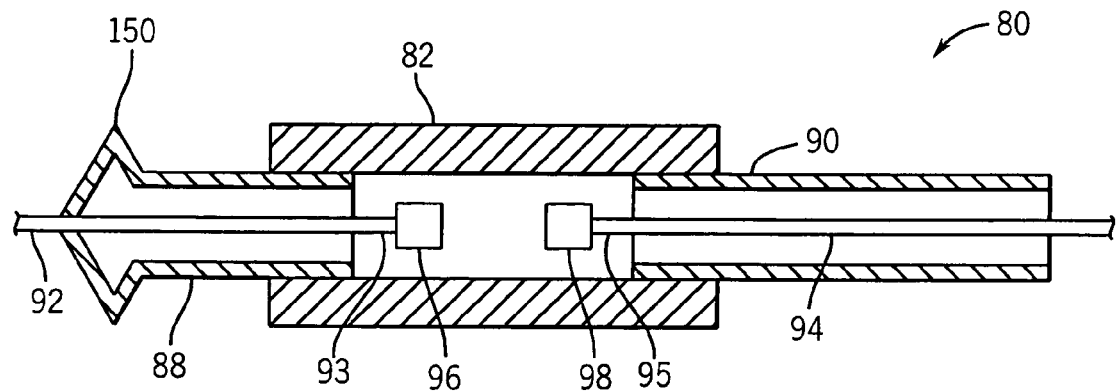

After assembling the dosing tubes 80, 100, and 120 with the respective arc envelopes 82, 102, and 122, the present technique proceeds to seal, evacuate, and dose the respective lamps 80, 100, and 120 with the desired dosing materials. FIGS. 10-13 are cross-sectional side views of the lamp illustrated in FIG. 6 further illustrating a material dosing and sealing process of the lamp. However, the process is also applicable to other forms of lamps, such as those illustrated in FIGS. 1-5. In the illustrated embodiment, the lamp 80 has two dosing tubes 88 and 90, only one of which is needed for injecting the dosing material into the lamp 80. Accordingly, as illustrated in FIG. 10, the dosing tube 88 is closed by a cold welding or crimping operation to form a hermetical seal 150. For example, an embodiment of the dosing tube 88 formed of a niobium or molybdenum-rhenium alloy is mechanically compressed by a crimping tool or other mechanical deformation tool. If a stronger bond is desired at the hermetical seal 150, then heat is applied (e.g., a laser weld, induction heat, etc.) to the hermetical seal 150. In addition, the foregoing closure of the dosing tube 88 functions to set the position of the wire lead 92 and/or the arc electrode 93, thereby providing control over the positioning of the arc tip 96.

Once sealed, the lamp 80 is coupled to one or more processing systems to provide a desired dosing material in the lamp 80. In the illustrated embodiment of FIG. 11, a processing system 152 operates to evacuate any substances 154 currently in the arc envelope 82, as indicated by arrows 156, 158, and 160. For example, the substances 154 may include air, residue from the bonding processes, and other undesirable substances.

After evacuating these substances 154, the processing system 152 proceeds to inject one or more dosing materials 162 into the arc envelope 82, as illustrated by arrows 164, 166, and 168 in FIG. 12. For example, certain embodiments of the dosing materials 162 comprise a rare gas and mercury. Other embodiments of the dosing materials 162 comprise a rare gas, mercury, and a halide (e.g., bromine, rare-earth metal halide, etc.). Moreover, different embodiments of the dosing materials 162 are injected into the arc envelope 82 in the form of a gas, a liquid, or a solid, such as a dosing pill.

Figure 13:
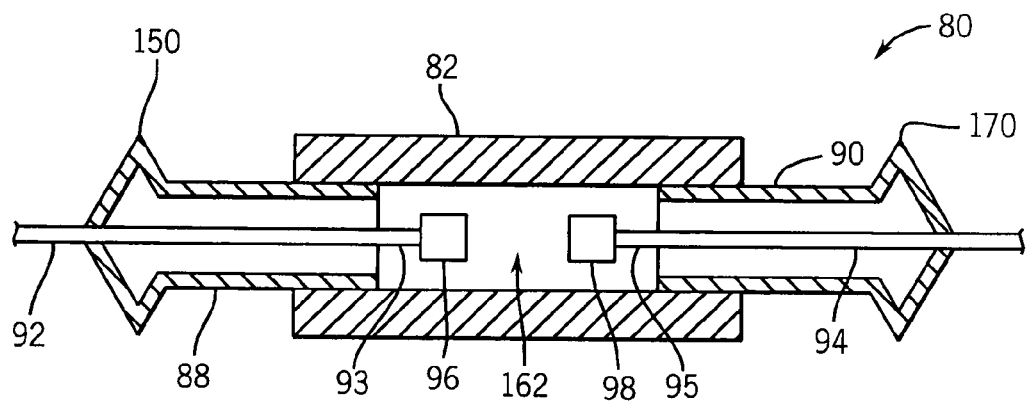

After injecting the desired dosing materials 162 into the lamp 80, the present technique proceeds to close the remaining dosing tube 90, as illustrated in FIG. 13. For example, as described above, certain embodiments of the dosing tube 90 comprise a ductile material, such as a niobium or molybdenum-rhenium alloy. Accordingly, ductile embodiments of the dosing tube 90 are mechanically compressed by a crimping tool or other mechanical deformation tool to form a hermetical seal 170. Again, if a stronger bond or seal is desired at the hermetical seal 170, then localized heating is applied to the region of the hermetical seal 170 during or after the crimping process. In addition, the foregoing closure of the dosing tube 90 functions to set the position of the wire lead 94 and/or the arc electrode 95, thereby providing control over the positioning of the arc tip 98. Accordingly, the closure of both dosing tubes 88 and 90 about the wire leads 92 and 94 and/or the arc electrodes 93 and 95 facilitates precision arc gap control for the arc tips 96 and 98.

Figure 14:
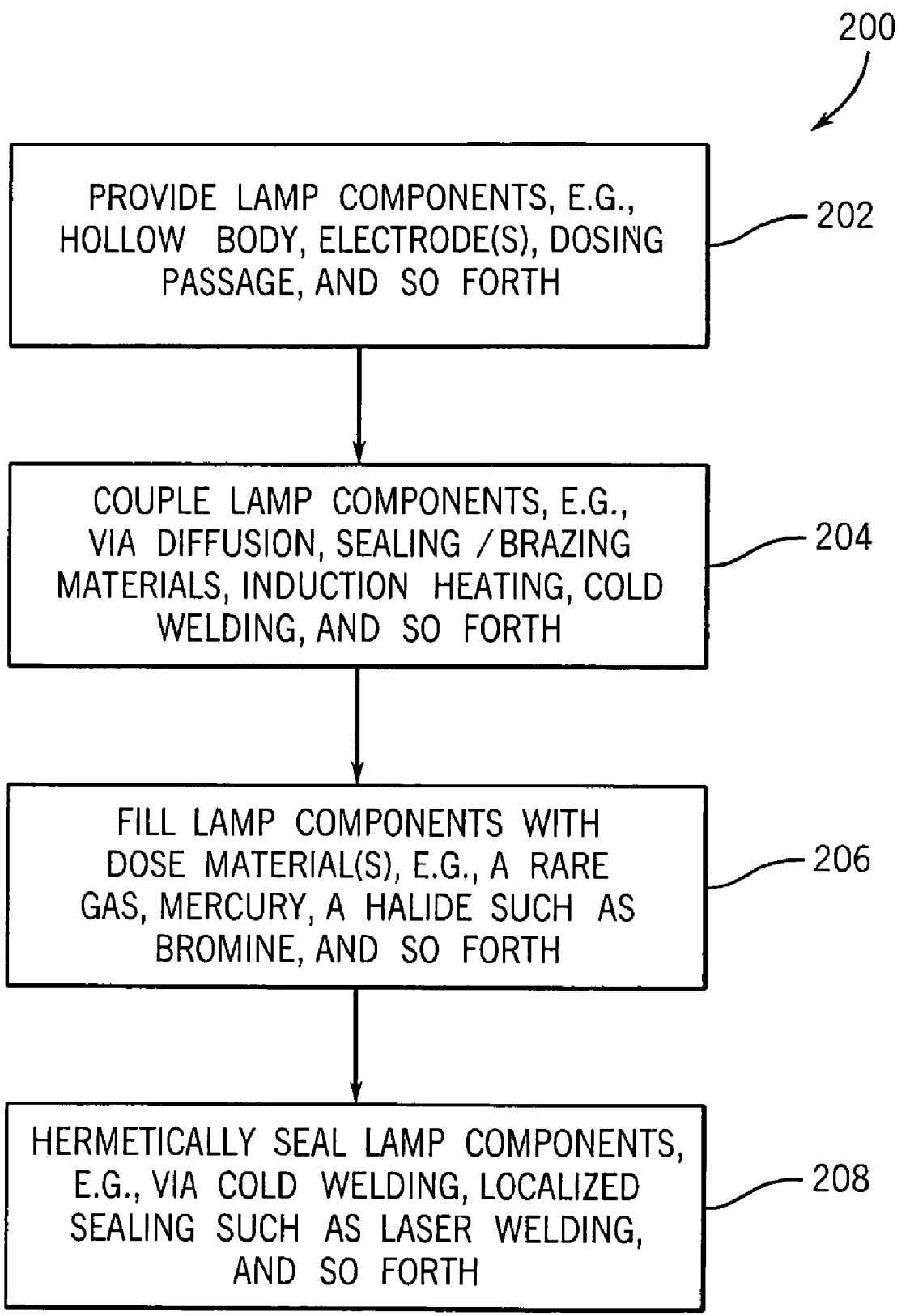
FIG. 14 is a flowchart illustrating the lamp assembly, dosing, and sealing process depicted structurally in FIGS. 1-13.

FIG. 14 is a flowchart illustrating an exemplary lamp assembly, dosing, and sealing process 200, which is best understood with reference to the various lamp embodiments of FIGS. 1-13. As illustrated in FIG. 14, the process 200 begins by providing a variety of lamp components, such as a hollow body or arc envelope, one or more arc electrodes and leads, one or more dosing passages, and one or more end structures depending on the particular embodiment (block 202). These components are either standard or custom components, which are purchased from an external source, formed in house, tailored to a particular lamp, or obtained by other means. For example, certain embodiments of the lamp comprise arc electrodes purchased from outside vendors, while the arc envelope or dosing passages are manufactured in-house using the desired materials. Moreover, some embodiments of the lamp have shortened or lengthened arc envelopes and dosing tubes, different material compositions, and other geometrical and material characteristics. The materials and structures described above are also applicable to the lamp components provided in block 202.

After obtaining, manufacturing, or generally providing the desired lamp components, the process 200 proceeds to couple the lamp components together by suitable bonding techniques (block 204). Different embodiments of the bonding block 204 comprise one or more of material diffusion bonding, sealing/brazing materials, induction heating, cold welding, crimping, and/or simplified geometrical interfaces. For example, some embodiments of the bonding block 204 assemble an arc envelope, one or more end structures, and one or more dosing tubes, as illustrated in FIGS. 2-3 and 6-8. If the assembled lamp has multiple dosing tubes, such as FIGS. 6-8, then the bonding block 204 also comprises bonding shut or generally closing all but one of the dosing tubes. For example, in certain embodiments, the bonding block 204 closes the dosing tubes by mechanical deformation, localized heating, and/or any other suitable sealing technique (see FIGS. 10-12).

Turning now to block 206 of FIG. 14, the process 200 proceeds to fill the lamp components (e.g., the hermetically sealed arc envelope and dosing tube) with a desired dose material, such as a rare gas, mercury, a halide such as bromine or iodine, and/or a metal halide (block 206). The dosing step 206 is performed with any suitable processing system, such as the processing system 152 described with reference to FIGS. 10-12. As noted above, different embodiments of the dosing materials are in a gaseous state, a fluid state, and/or a solid state (e.g., a pill, powder, etc.). Moreover, if the dosing materials comprise multiple substances, then some embodiments of the dosing step 206 comprise injecting the individual substances either separately or jointly into the lamp components. If desired, the dosing step 206 also involves evacuating the lamp components prior to injecting the foregoing dosing materials.

In block 208 of FIG. 14, the process 200 creates a hermetical seal of the overall lamp assembly, thereby sealing the dosing materials injected within the lamp components (e.g., within the arc envelope). For example, different embodiments of the sealing block 208 comprise one or more hermetical sealing or bonding processes, such as cold welding, localized sealing (e.g., laser welding, induction heating, etc.), and crimping (block 208). As a result of these sealing techniques, the lamp produced by the process 200 has a variety of unique sealing characteristics, corrosion resistance, workability at high internal temperatures and pressures, and reduced susceptibility to stress and cracks.

As discussed in further detail below with reference to FIGS. 15-21, several embodiments of the lamp comprise seal material bonds. These seal material bonds have characteristics at least partially attributed to the type of materials used for the various lamp components, e.g., the arc envelope, dosing tubes, and end structures. For example, some embodiments of the lamps are formed from a sapphire tubular arc envelope bonded with a polycrystalline alumina (PCA) end structure. At the various bonding interfaces between components, these lamps comprise a seal material (e.g., a seal glass or niobium braze) having a desired coefficient of thermal expansion (CTE) to control stresses at each PCA/sapphire seal interface. For example, some of the different seal materials comprise a seal glass that minimizes tensile stresses developed upon cooling, e.g., a seal glass with a CTE value that is the average value of PCA and the a-axis or radial value of edge-defined-grown sapphire. Again, in certain embodiments, localized heating is applied to the seal material to control the local microstructural development of the seal material, e.g., the seal glass. Moreover, some embodiments of the lamp have seal material applied to select areas of the seal interface (e.g., the PCA/sapphire interface), while other interfaces have seal-material-free bonds (e.g., material diffusion bond).

Figure 15:
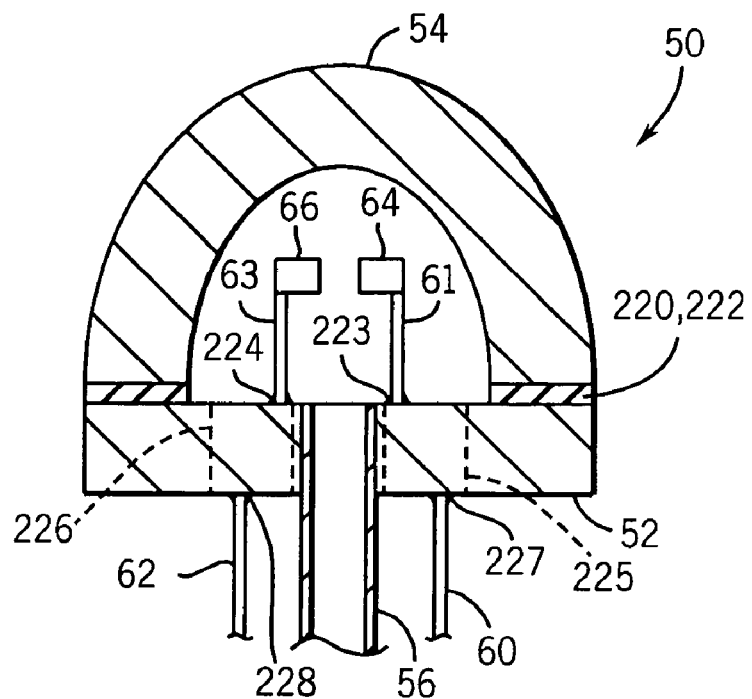
FIG. 15 is a cross-sectional side view of an alternative embodiment of the lamp illustrated in FIG. 3 further illustrating an exemplary butt-seal of the arc envelope with the end structure via a seal material.

Turning now to FIGS. 15-21, various embodiments will be described in light of the foregoing discussion. FIG. 15 is a cross-sectional side view of an alternative embodiment of the lamp 50 illustrated in FIG. 3. As illustrated, the lamp 50 has an exemplary end-to-end or butt-seal 220 between the arc envelope 54 and the end structure 52 via a seal material 222. Again, the illustrated arc envelope 54 has a dome-shaped, cup-shaped, or generally semispherical-shaped geometry. In this exemplary embodiment, the arc electrodes 61 and 63 are bonded to an inner portion of the end structure 52 via bonds 223 and 224. Similarly, the lead wires 60 and 62 are bonded to an outer portion of the end structure 52 via bonds 227 and 228. As illustrated, the end structure 52 comprises a non-conducting material having at least two conducting portions 225 and 226 extending between the inner and outer portions, such that the lead wire 60 is electrically coupled to the arc electrode 61 and the lead wire 62 is electrically coupled to the arc electrode 63. For example, some embodiments of the conducting portions 225 and 226 comprise a cermet material. These alternative lead wire configurations generally avoid lead wire sealing issues in the end structure 52. Other embodiments extend the lead wires 60 and 62 and/or the arc electrodes 61 and 63 partially into the inner and outer portions of the end structure 52.

Figure 16:
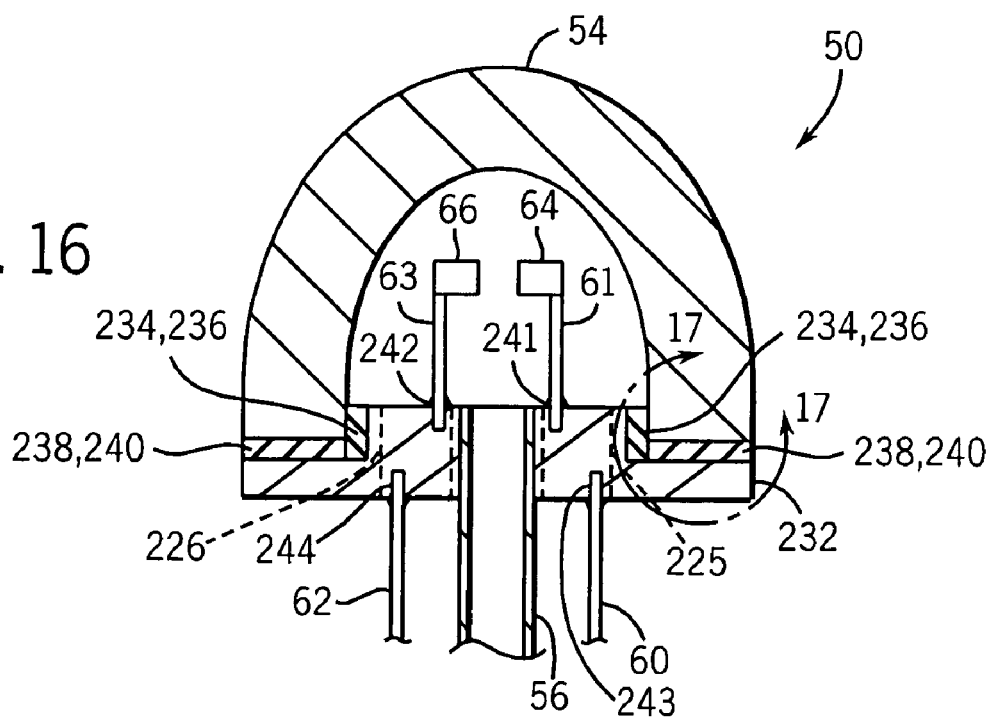
FIG. 16 is a cross-sectional side view of another alternative embodiment of the lamp illustrated in FIG. 3 having a stepped end structure.

FIG. 16 is a cross-sectional side view of another alternative embodiment of the lamp 50 illustrated in FIG. 3. As illustrated, the lamp 50 has an exemplary multi-seal-material joint 230 between the arc envelope 54 and a stepped-end structure 232. Other embodiments of the stepped end structure 232 comprise an angled interface (e.g., 90 degrees), a U-shaped or slot-shaped interface, or any other interface having portions disposed in different orientation. In this exemplary embodiment, multiple seal materials are selected to better accommodate the different coefficients of thermal expansion along the stepped interface between the arc envelope 54 and the stepped end structure 232. In this manner, potential stresses and cracks are substantially reduced in the joint 230 of the lamp 50. In some embodiments, the materials of the arc envelope 54 and the stepped-end structure 232 are selected with different coefficients of thermal expansion, such that the arc envelope 54 compresses or shrink-fits onto the stepped end structure 232. These compressive forces facilitate an improved seal between the arc envelope 54 and the stepped end structure 232.

Regarding the joint 230 illustrated in FIG. 16, the multi-seal-material joint 230 comprises a seal material 234 along an inner circular or annular interface 236 and another seal material 238 along a planar end or disc-shaped interface 240 of the arc envelope 54. Some embodiments also provide an isolating material between the two seal materials 234 and 238 to maintain their isolation from one another. The seal materials 234 and 238 are hermetically bonded between the arc envelope 54 and the stepped end structure 232 by applying a suitable source of heat. In certain embodiments, localized heating is applied to one of the seal materials (e.g., seal material 234) prior to curing the other seal material (e.g., seal material 238). If this multi-step curing process is used to cure the multi-seal-material joint 230, then the seal materials 234 and 238 are either identical or different sealing substances. Similarly, if an isolating material is disposed between the seal materials 234 and 238, then the seal materials 234 and 238 are either identical or different sealing substances. Otherwise, different sealing substances are selected for the seal materials 234 and 238. Additional configurations of the multi-seal-material joint 230 are illustrated with reference to FIGS. 17-19.

Focusing on the end structure of FIG. 16, the lead wires 60 and 62 and the arc electrodes 61 and 63 extend partially into the stepped-end structure 232. In this exemplary embodiment, the arc electrodes 61 and 63 extend into conducting portions 225 and 226 via bonds 241 and 242. Similarly, the lead wires 60 and 62 extend into conducting portions 225 and 226 via bonds 243 and 244. As discussed above, the conducting portions 225 and 226 are surrounded by a remaining non-conductive portion, such as a cermet, of the stepped-end structure 232. Again, any other configuration of the lamp components is within the scope of the present technique.

Figure 17:
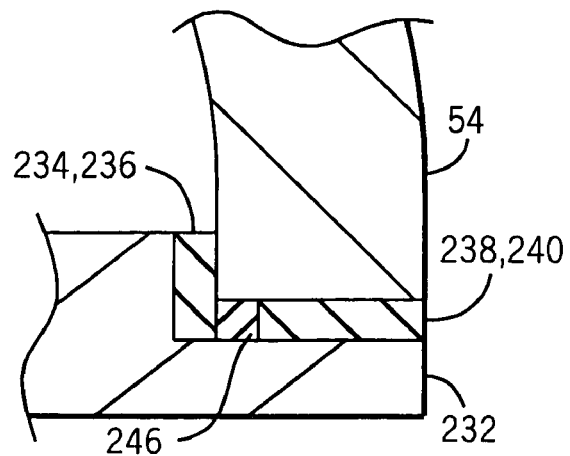
FIGS. 17, 18, and 19 are close-up cross-sectional views illustrating alternative configurations of the seal illustrated in FIG. 16.
Figure 18:
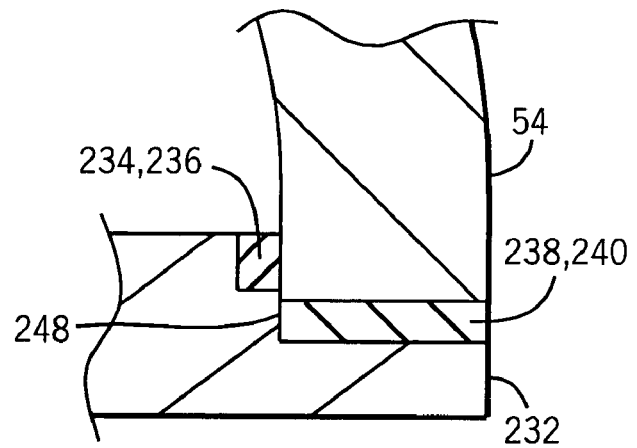
Figure 19:
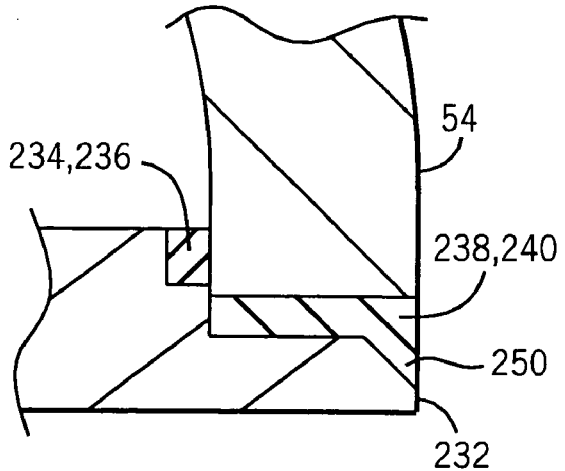

Turning now to FIGS. 17-19, various other embodiments of the multi-seal-material joint 230 are illustrated in close-up cross-sectional views. In FIG. 17, a barrier material 246 is disposed between the seal materials 234 and 238 to isolate the two seals as discussed above. FIG. 18 illustrates an alternative embodiment of the multi-seal-material joint 230, wherein the stepped-end structure 232 has an additional step or flange portion 248 extending between the two seal materials 234 and 238. In certain embodiments, one or more of the seal interfaces 236 and 240 have an angled geometry to facilitate the sealing process between the arc envelope 54 and the end structure 232. As illustrated in FIG. 19, the stepped end structure 232 is provided with an angled section 250 along the end interface 240.

Further alternative embodiments of the lamp 50 are illustrated with reference to FIGS. 20 and 21. In the embodiment of FIG. 20, an enclosing end structure 252 is disposed about an outer-end region of the arc envelope 54. As discussed in detail above, a variety of sealing techniques are used to couple the end structure 252 to the arc envelope 54. However, in the illustrated embodiment, seal materials 254 and 256 are disposed between the end structure 252 and the arc envelope 54 at an outer circular or annular interface 258 and a planar end or disc-shaped end interface 260 of the arc envelope 54. Again, these seal materials 254 and 256 comprise either identical or different sealing substances. If desired, the seal materials 254 and 256 are separated by a barrier material or a flange to facilitate the sealing process. Moreover, in certain embodiments, localized heating is applied in a multi-step curing process to provide different properties in the two seal materials 254 and 256.

As illustrated in FIG. 21, a slot-type end structure 270 is coupled to the arc envelope 54 of the lamp 50. In this exemplary embodiment, the lamp 50 has three different sealing interfaces between the arc envelope 54 and the end structure 270. In the illustrated embodiment, seal materials 272, 274, and 276 are disposed between the end structure 270 and the arc envelope 54 at an outer circular or annular interface 278, a planar end or disc-shaped interface 280, and an inner circular or annular interface 282, respectively. Depending on the particular embodiment of the lamp 50, these seal materials 272, 274, and 276 comprise either identical or different sealing substances. In alternative embodiments, one or more of these seal materials are substituted with a material diffusion bonding process. Localized heating is also used in some embodiments to cure the various seal materials and/or to provide different properties in the three seal materials 272, 274, and 276.

Figure 23:
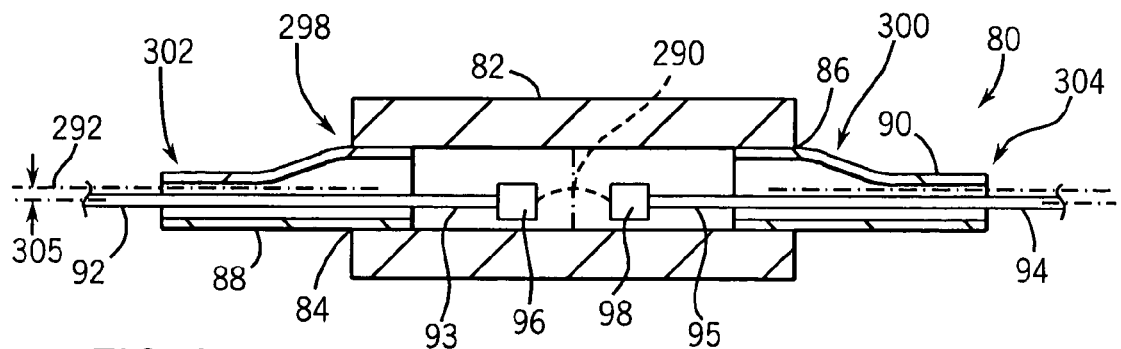
FIG. 23 is a cross-sectional side view of an alternate embodiment of the lamp illustrated in FIG. 6 having offset dosing tubes.

FIGS. 22 and 23 are cross-sectional side views of further alternate embodiments of the lamp 80 illustrated in FIG. 6. In these alternative embodiments, the illustrated arc electrodes 93 and 95 are positioned off-center within the arc envelope 82 to better accommodate an arc 290 forming between the arc tips 96 and 98. For example, FIG. 6 illustrates an alternative embodiment of the lamp 80 having the arc electrodes 93 and 95 angled away from a centerline 292 extending lengthwise through the arc envelope 82. As illustrated, the arc electrodes 93 and 95 have angled portions 294 and 296 within the arc envelope 82, such that the arc 290 forming between the arc tips 96 and 98 is substantially centered relative to the centerline 292. In this manner, the offset arc tips 96 and 98 improve thermal characteristics and performance of the lamp 80.

Similarly, the arc tips 96 and 98 of the lamp 80 illustrated in FIG. 23 are also off-center within the arc envelope 82. In this exemplary embodiment, the geometry of the dosing tubes 88 and 90 is modified to position the arc electrodes 93 and 95 and the arc tips 96 and 98 off-center, such that the arc 290 forming between the arc tips 96 and 98 is substantially centered relative to the centerline 292. As illustrated, the dosing tubes 88 and 90 have different sized ends that are not centered relative to one another. Tubular ends 298 and 300 of the dosing tubes 88 and 90 are sized to fit within the opposite receptacles are open ends 84 and 86 the arc envelope 82, such that the centerlines of these tubular ends 298 and 300 and open ends 84 and 86 are generally aligned with one another. Accordingly, during assembly, these tubular ends 298 and 300 are inserted into these open ends 84 and 86 and subsequently bonded to form a hermetic seal with the arc envelope 82 by any of the bonding techniques described in detail above. However, tubular ends 302 and 304 of the dosing tubes 88 and 90 are relatively smaller and off-center 305 relative to the tubular ends 298 and 300 and the open ends 84 and 86. Accordingly, during assembly, the lead wires 92 and 94 and/or the arc electrodes 93 and 95 are secured within the undersized and off-center tubular ends 302 and 304, such that the arc tips 96 and 98 are also positioned off-center 305 within the dosing tubes 88 and 90. If desired, this off-center position 305 is further supported by filler material, spacers, or other suitable supports. However, any suitable configuration is within the scope of the present technique. As discussed above with reference to FIG. 22, the resulting off-centered arc tips 96 and 98 improve thermal characteristics and performance of the lamp 80.

Figure 26:
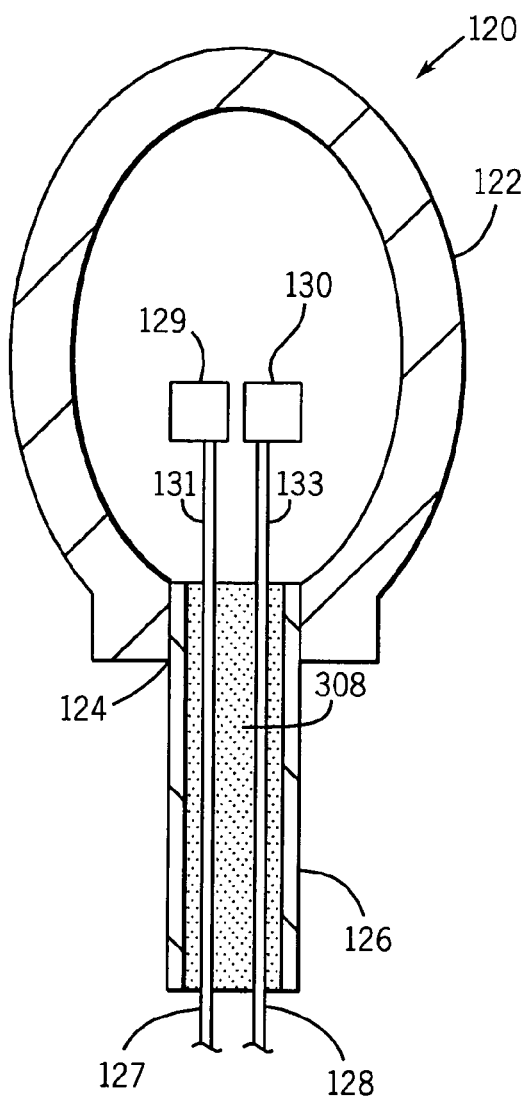
FIG. 26 is a cross-sectional side view of an alternate embodiment of the lamp illustrated in FIG. 8 having a non-conductive filler or seal material within a dosing tube around a pair of leads for electrodes.

FIGS. 24, 25, and 26 are cross-sectional views of further alternate embodiments of the lamp 120 illustrated in FIG. 8. In these alternative embodiments, the illustrated wire leads 127 and 128 and/or the arc electrodes 131 and 133 are electrically isolated from one another 30 by a suitable non-conductive material. The illustrated lamp 120 comprises the single dosing tube 126 hermetically sealed within the open end 124 of the generally round hollow body or arc envelope 122. Again, the illustrated arc envelope 122 has an egg-shaped, oval, or generally elliptical geometry. In the embodiment illustrated in FIG. 24, the lead wires 127 and 128 are electrically isolated from one another through the dosing tube 126 by an insulating or non-conductive jacket 306 disposed about the lead wire 128. FIG. 25 is a cross-sectional view of the dosing tube 126 illustrating this electrical isolation between the lead wires 127 and 128. If desired, the lead wires 127 and 128 are further supported by one or more spacers 134 or filler materials within the dosing tube 126. In the embodiment illustrated in FIG. 26, the lead wires 127 and 128 are electrically isolated and spaced from one another through the dosing tube 126 by an insulating or non-conductive filler material 308, which completely separates the lead wires 127 and 128. Again, any other suitable isolation techniques are within the scope of the present technique.

Figure 27:
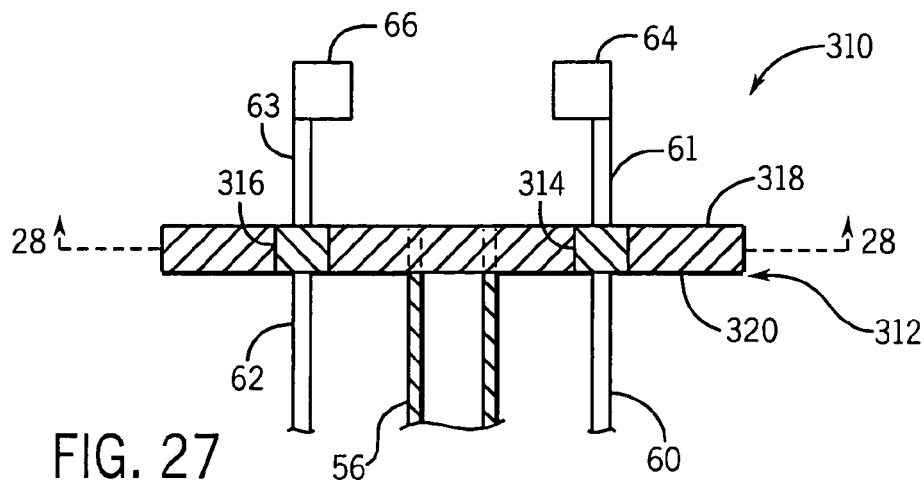
FIGS. 27, 28, 29, 30, and 31 are cross-sectional views of alternate embodiment of the lamp illustrated in FIG. 3 illustrating various configurations of the dosing tube and the arc electrodes.

FIGS. 27 through 31 illustrate further alternate embodiments of the end structures 52, 232, 252, and 270 described with reference to FIGS. 3 and 15 through 21. For example, FIG. 27 is a partial cross-sectional side view of an alternative lamp 310 comprising a nonconductive base or end structure 312 having a generally flat or planar configuration. Accordingly, this planar configuration of the end structure 312 facilitates a planar bonding interface with an adjacent arc envelope (not illustrated). The nonconductive base or end structure 312 also has conductive portions 314 and 316 extending between inner and outer surfaces 318 and 320. As illustrated, the lead wires 60 and 62 are coupled to the conductive portions 314 and 316 at the outer surface 320 of the nonconductive end structure 312. Similarly, the arc electrodes 61 and 63 are coupled to the conductive portions 314 and 316 at the inner surface 318 of the nonconductive end structure 312. Accordingly, these conductive portions 314 and 316 provide a conductive path between the lead wires and 60 and 62 and the arc electrodes 61 and 63, while also eliminating the potential for leaks attributed to passageways for the lead wires 60 and 62 and the arc electrodes 61 and 63. As illustrated in FIGS. 27-31, the lamp 310 also comprises the dosing tube 56 hermetically sealed or bonded to the nonconductive base or end structure 312. The electrodes 63 and 61 and the lead wires 62 and 60 may also be inserted partially into the conductive parts 316 and 314 similar to the embodiment illustrated in FIG. 16.

Figure 28:
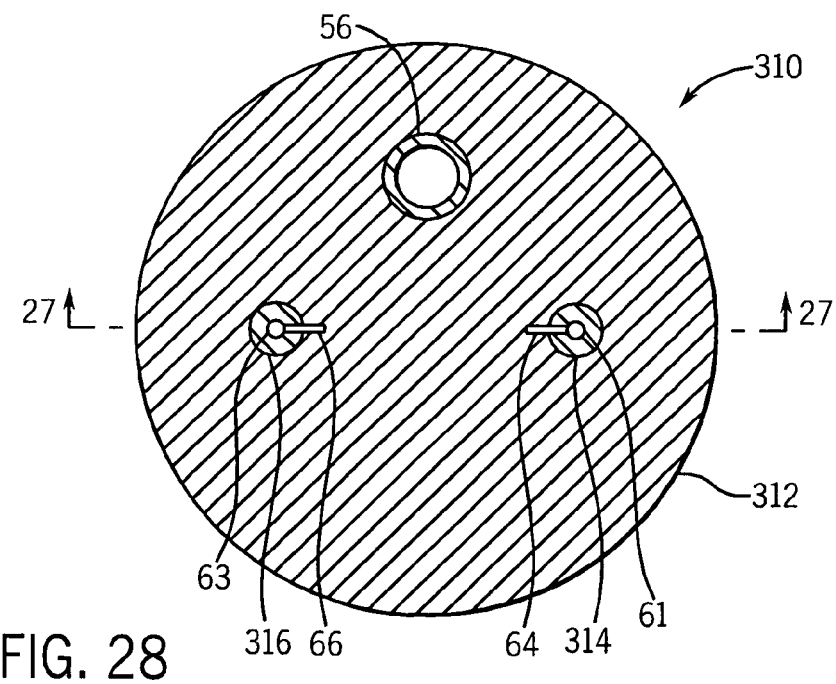

FIG. 28 is a cross-sectional top view of the lamp 310 described with reference to FIG. 27. As illustrated, the dosing tube 56 is spaced apart from the arc electrodes 61 and 63, the arc tips 64 and 66, and the conductive portions 314 and 316. In this manner, the position of the dosing 256 does not interfere with the spacing between the arc electrodes 61 and 63, the arc tips 64 and 66, and the conductive portions 314 and 316. Accordingly, the illustrated embodiment facilitates close positioning of the arc electrodes 61 and 63 to provide a relatively short arc path between the arc tips 64 and 66.

Figure 29:
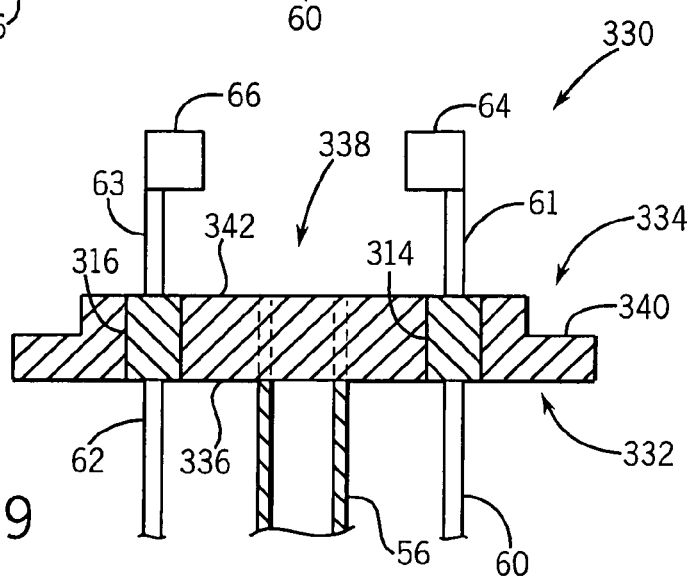

FIG. 29 is a partial cross-sectional side view of an alternative lamp 330 comprising a nonconductive base or end structure 332 having a stepped or multi-leveled outer perimeter 334. As illustrated, the end structure 332 has a lower surface 336 that is substantially flat. However, the multi-leveled outer perimeter 334 is disposed on an upper surface 338 of the end structure 332 for bonding with a corresponding arc envelope (not illustrated). In the illustrated embodiment, the multi-leveled outer perimeter 334 defines a generally L-shaped groove 340 in the otherwise flat geometry 342 of the upper surface 338. Similar to the lamp 310 illustrated in FIG. 27, the nonconductive base or end structure 332 also comprises the conductive portions 314 and 316 extending between the outer and inner surfaces 336 and 342. Again, the lead wires 60 and 62 are coupled to the conductive portions 314 and 316 at the outer surface 336 of the nonconductive end structure 332. Similarly, the arc electrodes 61 and 63 are coupled to the conductive portions 314 and 316 at the inner surface 342 of the nonconductive end structure 332. Accordingly, these conductive portions 314 and 316 provide a conductive path between the lead wires and 60 and 62 and the arc electrodes 61 and 63, while also eliminating the potential for leaks attributed to passageways for the lead wires 60 and 62 and the arc electrodes 61 and 63. In addition, the lamp 330 comprises the dosing tube 56 hermetically sealed or bonded to the nonconductive base or end structure 332. For example, as described above with reference to FIG. 28, certain embodiments of the lamp 330 space the components to provide a relatively short arc path between the arc tips 64 and 66.

Figure 30:
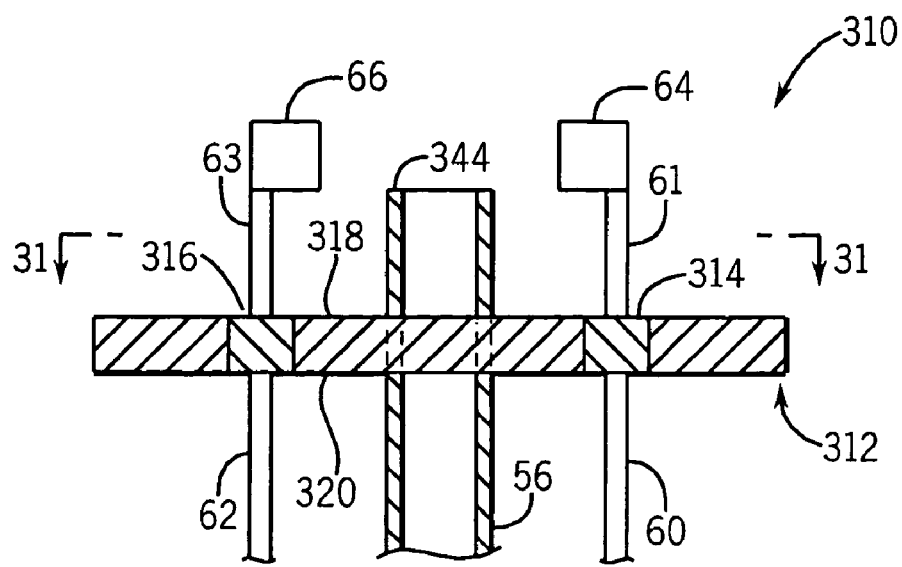

In other embodiments, the dosing tube 56 is positioned close to the arc tips 64 and 66 to facilitate the creation of an arc between the arc tips 64 and 66. For example, FIG. 30 is a partial cross-sectional side view of an alternative embodiment of the lamp 310 illustrated in FIG. 27 having the dosing tube 56 projecting beyond the inner surface 318, such that an end 344 of the dosing tube 56 is relatively closer to the arc tips 64 and 66. Accordingly, the distance between the dosing tube 56 and each of the arc tips 64 and 66 is relatively less than the distance between the arc tips 64 and 66. In operation, the relatively close proximity of the dosing tube 56 with the arc tips 64 and 66 facilitates arc formation initially between the dosing tube 56 and one of the arc tips 64 and 66. After the initial arc, a full arc is extended between the two arc tips 64 and 66. For example, the initial arc functions to ionize the internal dosing materials (e.g., rare gas and mercury), thereby lowering the requisite voltage to bridge the arc gap between the arc tips 64 and 66. Once the gases are ionized, the arc more easily bridges the gap between the arc tips 64 and 66. Accordingly, the illustrated embodiment of the dosing tube 56 comprises a conductive material, such as a molybdenum or molybdenum-rhenium alloy, such that the dosing tube 56 functions as a starting device for the creation of an arc.

Figure 31:
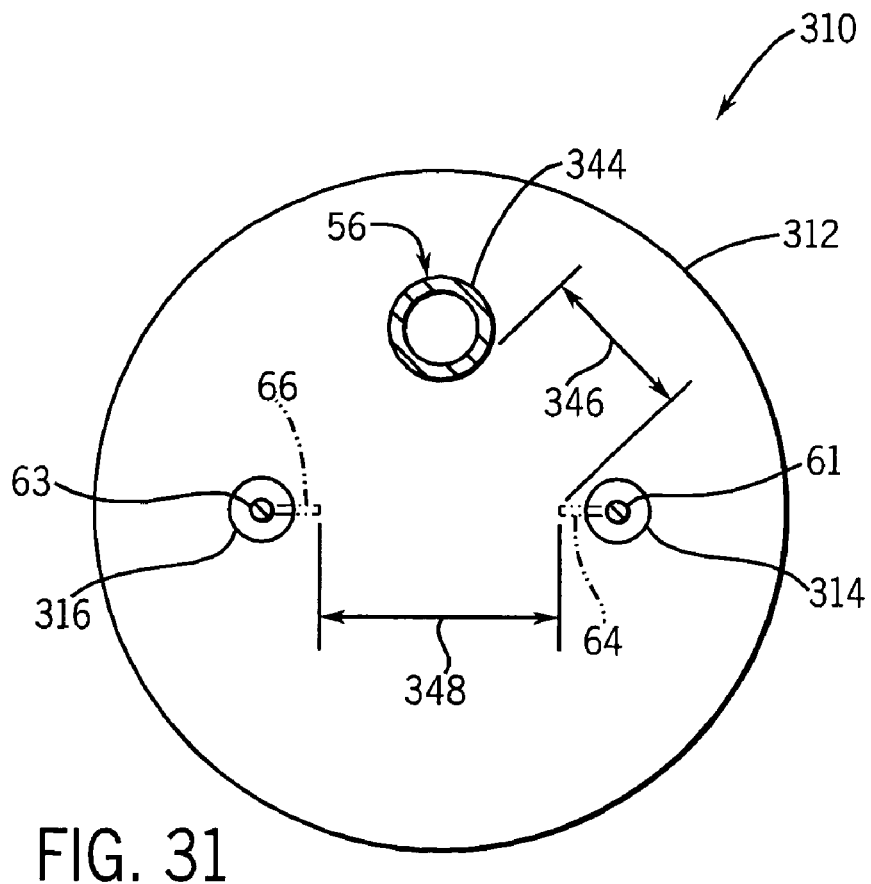

FIG. 31 is a top view of the lamp 310 illustrated in FIG. 30 further illustrating the geometrical positioning of the dosing tube 56 relative to the arc tips 64 and 66. As illustrated, the dosing tube 56 is spaced apart from arc tip 64 by a shortened distance 346 relative to a normal arc tip spacing 348 between the arc tips 64 and 66. Accordingly, the shortened distance 346 facilitates the initial creation of an arc, which subsequently bridges across the two arc tips 64 and 66. Similar to the embodiment illustrated in FIG. 28, the illustrated embodiment facilitates close positioning of the arc electrodes 61 and 63 to provide a relatively short arc path between the arc tips 64 and 66.

Figure 32:
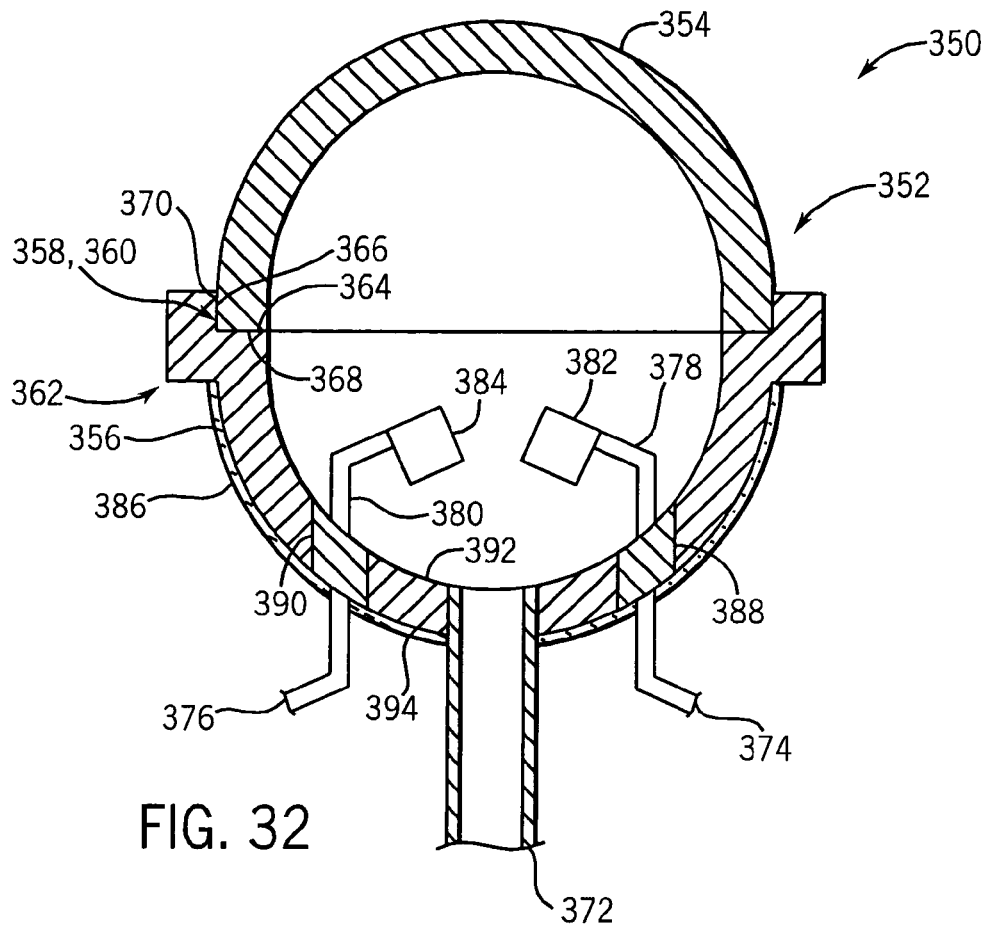
FIG. 32 is a cross-sectional side view of an alternate lamp having a upper and lower cup portions, angled arc electrodes, and a reflective layer or coating in accordance with certain embodiments of the present technique.

FIG. 32 is a cross-sectional side view of an alternative lamp 350 in accordance with certain embodiments of the present technique. As illustrated, the lamp 350 comprises an arc envelope 352 having upper and lower cup portions 354 and 356, which are coupled together at a stepped or multi-angled interface 358. The illustrated multi-angled interface 358 comprises an L-shaped groove 360 within a flanged structure 362 of the lower cup portion 356. The L-shaped groove 360 comprises a horizontal ring or disc portion 364 and a vertical ring or annular portion 366. These portions 364 and 366 of the L-shaped groove 360 interface the upper cup portion 354 at a corresponding facing end 368 and an outer perimeter 370 of the cup portion 354. In various embodiments, this multi-angled interface 358 is hermetically sealed using one or more seal materials, diffusion bonding processes, localized or non-localized heating processes, and/or other suitable bonding techniques.

The lamp 350 illustrated in FIG. 32 further comprises a dosing tube 372, lead wires 374 and 376, angled arc electrodes 378 and 380 having arc tips 382 and 384, and a reflective layer or coating 386. As illustrated, the dosing tube 372 is coupled to the lower cup portion 356 for injection of a desired dosing material, as discussed in detail above. The dosing tube 372 is subsequently sealed shut by cold welding, localized heating, and/or other suitable sealing techniques.

In the illustrated embodiment, the lower cup portion 356 also comprises a nonconductive material having at least two conductive portions 388 and 390 extending between inner and outer surfaces 392 and 394. At the outer surface 394, the lead wires 374 and 376 are coupled to the conductive portions 388 and 390. In turn, the angled arc electrodes 378 and 380 are coupled to the conductive portions 388 and 390 at the inner surface 392. In this manner, the conductive portions 388 and 390 provide a conductive path between the lead wires 374 and 376 and the angled arc electrodes 378 and 380, while also improving sealing characteristics of the lamp 350. Regarding the angled configuration of the arc electrodes 378 and 380, the illustrated embodiment provides a reduced arc distance for operation of the lamp 350. In addition, the curved geometry of the upper and lower cup portions 354 and 356 provides improved symmetry and space to accommodate an arc forming between the arc tips 382 and 384. In this manner, the foregoing features improve the thermal management and performance of the lamp 350.

In addition, the curved geometry of the lower cup portion 356 and the reflective layer or coating 386 also provide improved lighting performance of the lamp 350. The reflective layer or coating 386 functions to increase the collected lumens from an arc formed between the arc tips 382 and 384. In various embodiments, the material composition of the reflective layer or coating 386 comprises one or more layers of molybdenum, tungsten, rhenium, and/or other suitable materials. For example, some embodiments of the reflective layer or coating 386 comprise a multi-layered ceramic. The curved geometry further enhances this collection of lumens, while also providing directional control of the lumens. For example, different embodiments of the lower cup portion 356 comprise different curvatures, radii, thicknesses, and other geometrical configurations to capture and focus the lumens more efficiently and accurately. Embodiments of the lower cup portion 356 have various material compositions, such as alternating material layers of high indices of refraction and low indices of refraction (e.g., alternative layers of tantalum oxide and silicon dioxide).

Figure 33:
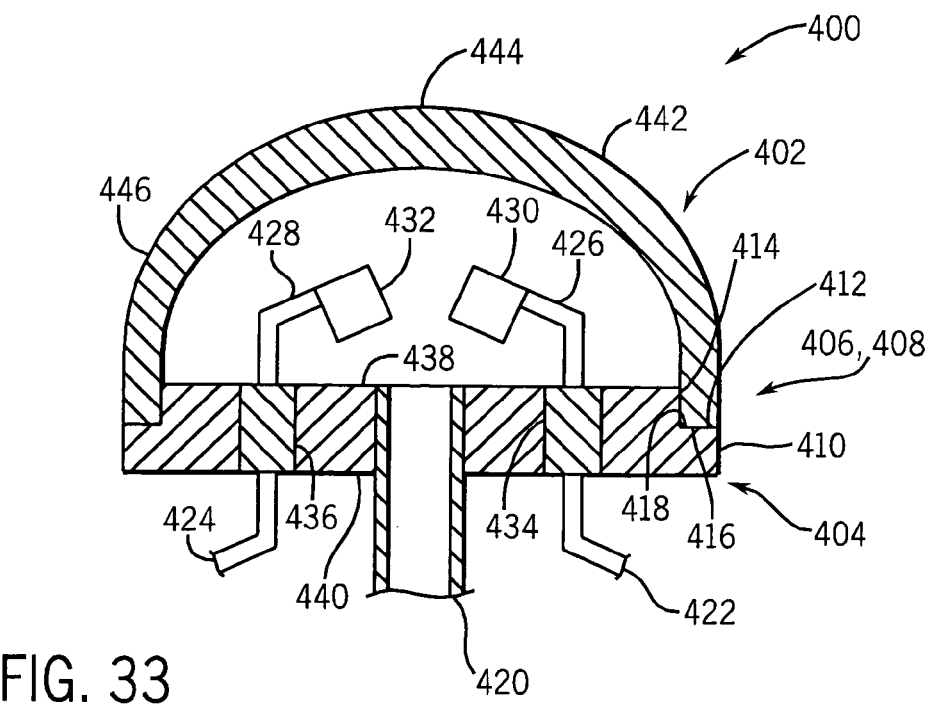
FIG. 33 is a cross-sectional side view of an alternate embodiment of the lamp illustrated in FIG. 3 having a dome-shaped structure adapted to lens the light.

FIG. 33 is a cross-sectional side view of an alternative lamp 400 in accordance with certain embodiments of the present technique. As illustrated, the lamp 400 comprises an arc envelope 402 and an end structure 404, which are coupled together at a stepped or multi-angled interface 406. The illustrated multi-angled interface 406 comprises an L-shaped groove 408 at an outer perimeter 410 of the end structure 404. The L-shaped groove 408 comprises a horizontal ring or disc portion 412 and a vertical ring or annular portion 414. These portions 412 and 414 of the L-shaped groove 408 interface the arc envelope 402 at a corresponding facing end 416 and an inner perimeter 418 of the arc envelope 402. In various embodiments, this multi-angled interface 406 is hermetically sealed using one or more seal materials, diffusion bonding processes, localized or non-localized heating processes, and/or other suitable bonding techniques.

Regarding the end structure 404, the lamp 400 illustrated in FIG. 33 further comprises a dosing tube 420, lead wires 422 and 424, and angled arc electrodes 426 and 428 having arc tips 430 and 432. As illustrated, the dosing tube 420 is coupled to the end structure 404 for injection of a desired dosing material, as discussed in detail above. The dosing tube 420 is subsequently sealed shut by cold welding, localized heating, and/or other suitable sealing techniques.

In the illustrated embodiment of FIG. 33, the end structure 404 also comprises a nonconductive material having at least two conductive portions 434 and 436 extending between inner and outer surfaces 438 and 440. At the outer surface 440, the lead wires 422 and 424 are coupled to the conductive portions 434 and 436. In turn, the angled arc electrodes 426 and 428 are coupled to the conductive portions 434 and 436 at the inner surface 438. In this manner, the conductive portions 434 and 436 provide a conductive path between the lead wires 422 and 424 and the angled arc electrodes 426 and 428, while also improving sealing characteristics of the lamp 400. Regarding the angled configuration of the arc electrodes 426 and 428, the illustrated embodiment provides a reduced arc distance for operation of the lamp 400. The angled configuration of the arc electrodes 426 and 428 also improves thermal management and performance of the lamp 400. For example, the angled configuration of the arc electrodes 426 and 428 facilitates a relatively centralized and/or symmetrical positioning arc that forms between the arc tips 430 and 432 during operation of the lamp 400. In this manner, heat is more evenly distributed throughout the lamp 400.

Regarding optical characteristics and lighting performance, the arc envelope 402 illustrated in FIG. 33 comprises a lens structure or dome 442 having a relatively thick central portion 444 and a relatively thin outer portion 446. In operation, the dome 442 focuses or lenses the light generated at the arc tips 430 and 432. For example, certain embodiments of the dome 442 function to focus the light on a particular target at a desired distance from the lamp 400. In this manner, the dome 442 increases the use of light for a particular application. For example, different embodiments of the dome 442 comprise different curvatures, radii, thicknesses, and other geometrical configurations to capture and focus the light more efficiently and accurately. Additional performance and efficiencies are achieved by a combination of the dome 442 of FIG. 33 and the lower cup portion 356 of FIG. 32. Moreover, any of the features described above with reference to FIGS. 1-33 are applicable to any one of the embodiments illustrated by FIGS. 1-33, such that further alternative embodiments comprise any combination of the features described herein.

While the invention may be susceptible to various modifications and alternative forms, specific embodiments have been shown by way of example in the drawings and have been described in detail herein. However, it should be understood that the invention is not intended to be limited to the particular forms disclosed. For example, the features described above with reference to the figures may be applied in any suitable combination to a lamp assembly, a manufacturing process, or other lighting systems and processes. Accordingly, the invention is to cover all modifications, equivalents, and alternatives falling within the spirit and scope of the invention as defined by the following appended claims.

What is claimed is:

1. A lamp, comprising:
   an arc envelope; and
   a first dosing tube coupled to the arc envelope;
   a second dosing tube coupled to the arc envelope, wherein the first and second dosing tubes are ductile at room temperature;
   a first arc electrode lead extending lengthwise completely through the first dosing tube;
   a second arc electrode lead extending lengthwise completely through the second dosing tube, wherein the first and second arc electrode leads are coupled to first and second arc tips, respectively; and
   an arc gap between the first and second arc tips, wherein the arc gap is set at room temperature via compressed sections in the first and second dosing tubes, and the compressed sections seal the first and second dosing tubes and secure the first and second arc electrode leads at the arc gap.

2. A lighting device, comprising:
   an arc envelope consisting essentially of a geometry that is symmetrical about an axis;
   a dosing tube, wherein an open end of the dosing tube is diffusion bonded to the arc envelope;
   a pair of arc electrodes disposed within the arc envelope, wherein the pair of arc electrodes is angled toward positions offset on the same side from the axis of the arc envelope.

3. The lighting device claim 2, comprising means for electrically isolating a pair of lead wires for the pair of arc electrodes.

4. The lighting device claim 2, comprising a dosing material disposed within the arc envelope, wherein the dosing material comprises a rare gas and mercury.

5. The lighting device claim 4, wherein the dosing material further comprises a halide.

6. The lighting device claim 2, wherein the arc envelope comprises means for geometrically lensing light generated within the arc envelope.

7. The lighting device claim 2, wherein the arc envelope comprises a transparent ceramic.

8. The lighting device of claim 2, comprising means for compressively closing a passageway through the dosing tube at room temperature.

9. A system, comprising:
   a lighting device, comprising:
      a hollow structure comprising a plurality of sections;
      first and second arc electrodes having respective first and second tips disposed within the hollow structure;
      an ionizable gas and mercury disposed within the hollow structure;
      first and second tubes configured to support the respective first and second arc electrodes, wherein the first and second tubes comprise varying diameters that define a plurality of centerlines offset from one another within each of the respective first and second tubes, and the varying diameters are configured to position the respective first and second tips at positions offset from a lengthwise centerline of the hollow structure.

10. The system of claim 9, wherein at least one of the plurality of sections comprises a transparent ceramic.

11. The system of claim 9, wherein at least one of the plurality of sections comprises a dosing tube.

12. The system of claim 9, wherein the plurality of sections comprise an arc envelope and an end structure.

13. The system of claim 9, wherein the positions of the first and second tips are configured to position an electrical arc substantially centered within the hollow structure.

14. The system of claim 9, comprising means for electrically isolating leads for the pair of arc electrodes.

15. The system of claim 9, comprising means for hermetically sealing the plurality of sections together.

16. A system, comprising:
   a lighting device comprising:
   a hollow body comprising a first section and a second section coupled together, wherein at least one of the first and second sections comprises a transparent ceramic;
   a first tube comprising a first variable geometry defining opposite open ends having centerlines offset from one another by a first offset distance;
   a second tube comprising a second variable geometry defining opposite open ends having centerlines offset from one another by a second offset distance;
   a first arc electrode supported by the first tube at a first position offset from a centerline of the hollow body via the first variable geometry;

a second arc electrode supported by the second tube at a second position offset from the centerline of the hollow body via the second variable geometry; and an ionizable gas and mercury disposed within the hollow body.

17. The system of claim 16, wherein the first and second arc electrodes are supported at the first and second positions to position an arc path at a substantially central position within the arc envelope.

18. A lighting device, comprising:

an end structure adapted to close an open end of an arc envelope;

a dosing tube diffusion bonded to the end structure, wherein the dosing tube comprises a cold-welded seal; and a pair of arc electrodes mounted to the end structure, wherein the end structure comprises an insulative portion disposed about a pair of separate conductive portions, the end structure comprises opposite inner and outer sides relative to an interior of the arc envelope, the pair of separate conductive portions fill and seal passages extending between the inner and outer sides, each of the arc electrodes are coupled to one of the separate conductive portions on the interior side, lead wires are coupled to the separate conductive portions on the outer side, and the lead wires are completely separated from the arc electrodes by the pair of separate conductive portions.

19. The lighting device of claim 18, wherein the end structure comprises a discshaped member.

20. The lighting device of claim 18, wherein the end structure comprises a dome-shaped member having a variable wall thickness configured to focus light.

* * * * *

UNITED STATES PATENT AND TRADEMARK OFFICE
CERTIFICATE OF CORRECTION

PATENT NO.        : 7,839,089 B2
APPLICATION NO.   : 10/738261
DATED             : November 23, 2010
INVENTOR(S)       : Bewlay et al.

It is certified that error appears in the above-identified patent and that said Letters Patent is hereby corrected as shown below:

On the Title Page, in Field (75), under "Inventors", in Column 1, Line 5, delete "Schnecetady," and insert -- Schenectady, --, therefor.

On the Title Page, in Field (75), under "Inventors", in Column 1, Line 5, delete "Lorio," and insert -- Iorio, --, therefor.

On the Title Page, in Field (56), under "U.S. PATENT DOCUMENTS", in Column 2, Line 1, after "Lange", insert -- 220/2.3R --.

On the Title Page, in Field (56), under "OTHER PUBLICATIONS", in Column 2, Line 1, delete "Dec. 17, 2003," and insert -- Dec. 18, 2002, --, therefor.

Title Page 2, in Field (56), under "U.S. PATENT DOCUMENTS", in Column 1, Line 23, delete "Eichelbronner et al." and insert -- Eichelbrönner et al. --, therefor.

Title Page 2, in Field (56), under "U.S. PATENT DOCUMENTS", in Column 1, Line 29, after "Heider et al", insert -- 313/625 --.

Title Page 2, in Field (56), under "U.S. PATENT DOCUMENTS", in Column 1, Line 38, after "Chang", insert -- 211/105.1 --.

Title Page 2, in Field (56), under "U.S. PATENT DOCUMENTS", in Column 2, Line 1, delete "Iorio" and insert -- Iorio et al. --, therefor.

In Column 20, Line 7, in Claim 3, delete "device" and insert -- device of --, therefor.

In Column 20, Line 10, in Claim 4, delete "device" and insert -- device of --, therefor.

In Column 20, Line 13, in Claim 5, delete "device" and insert -- device of --, therefor.

Signed and Sealed this
Tenth Day of May, 2011

David J. Kappos
*Director of the United States Patent and Trademark Office*

In Column 20, Line 15, in Claim 6, delete "device" and insert -- device of --, therefor.

In Column 20, Line 18, in Claim 7, delete "device" and insert -- device of --, therefor.